United States Patent
Tuan et al.

(10) Patent No.: US 8,263,513 B2
(45) Date of Patent: Sep. 11, 2012

(54) SINTERABLE BIOCERAMICS AND METHOD OF MANUFACTURING THE SAME

(75) Inventors: Wei-Hsing Tuan, Taipei (TW); Shu-Ting Kuo, Taipei (TW)

(73) Assignee: National Taiwan University, Taipei (TW)

( * ) Notice: Subject to any disclaimer, the term of this patent is extended or adjusted under 35 U.S.C. 154(b) by 234 days.

(21) Appl. No.: 12/624,222

(22) Filed: Nov. 23, 2009

(65) Prior Publication Data

US 2010/0179050 A1    Jul. 15, 2010

(30) Foreign Application Priority Data

Jan. 12, 2009 (TW) ............................. 98100973 A
Jul. 28, 2009 (TW) ............................. 98125273 A

(51) Int. Cl.
*C04B 35/03* (2006.01)
*C04B 33/32* (2006.01)
*C04B 33/36* (2006.01)
*C04B 35/64* (2006.01)
*B28B 1/00* (2006.01)
*B28B 3/00* (2006.01)
*B28B 5/00* (2006.01)

(52) U.S. Cl. ........ 501/123; 264/603; 264/652; 264/125; 106/772

(58) Field of Classification Search ............... 501/123, 501/125; 264/638, 652, 603, 125; 106/680, 106/701, 715, 722, 735, 772
See application file for complete search history.

(56) References Cited

U.S. PATENT DOCUMENTS 4,174,230 A * 11/1979 Hashimoto et al. ........... 106/660
6,586,752 B1 * 7/2003 Jin et al. ..................... 250/484.3

OTHER PUBLICATIONS

Stewart et al. Hot Corrosion of B-1900 Superalloy by Simulated Fluidized Bed Coal Combustor Deposits. Aug. 1982. Oxidation of Metals, vol. 18, Nos. 3/4, 1982. pp. 163-185.*
Garcia et al. Synthesis and Characterization of ZrO2-CaSO4 Materials Prepared by the Sol-Gel Method. Journal of Sol-Gel Science and Technology 32, 333-337, 2004.*
Akosman et al. Effective Diffusivities and Convective Coefficients for CaO—CaSO4 and CaO—CaCl2 Pellets. Chem. Eng. Technol. 2004, 27, 1. pp. 50-55.*

* cited by examiner

*Primary Examiner* — Noah Wiese
(74) *Attorney, Agent, or Firm* — Muncy, Geissler, Olds & Lowe, PLLC

(57) ABSTRACT

The present invention discloses a method that can improve the sintering ability of calcium sulfate. The material can be used as a bio-material. This method is prepared by pre-mixing +1 and/or +2 and/or +3 and/or +4 and/or +5 valence element and/or its chemical compounds which serves as a sintering additive to calcium sulfate. During sintering, the sintering additive may form a compound and/or a glass and/or a glass-ceramic to assist the densification of the calcium sulfate. The strength and biocompatibility of the specimen after sintering are satisfactory.

6 Claims, 22 Drawing Sheets

FIG. 8(a)  FIG. 8(b)
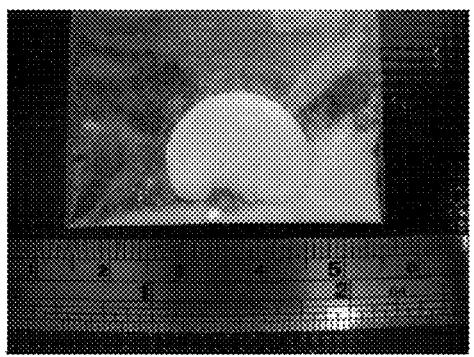 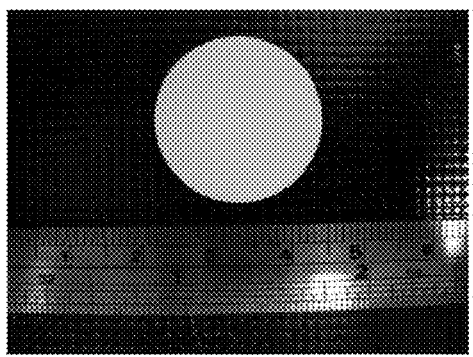
FIG. 8(c)  FIG. 8(d)
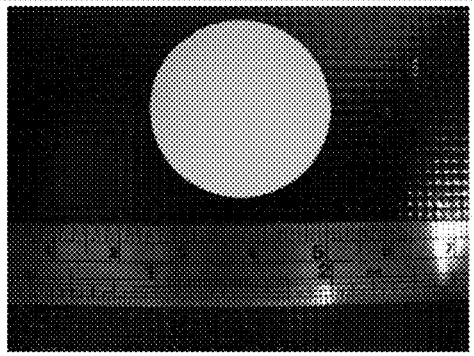 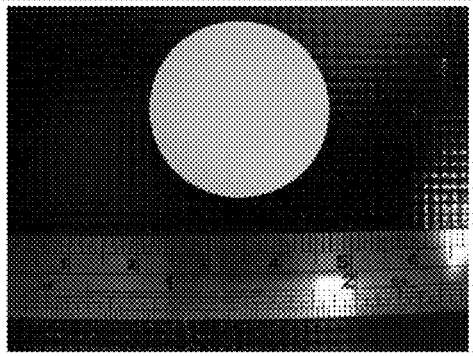
FIG. 8(e)
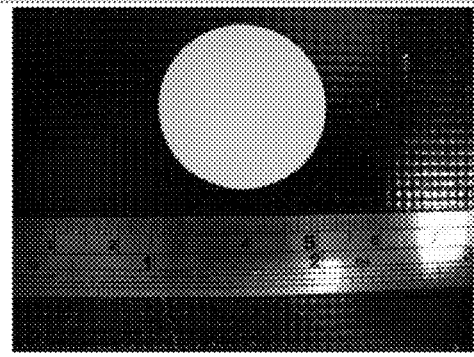

FIG. 13
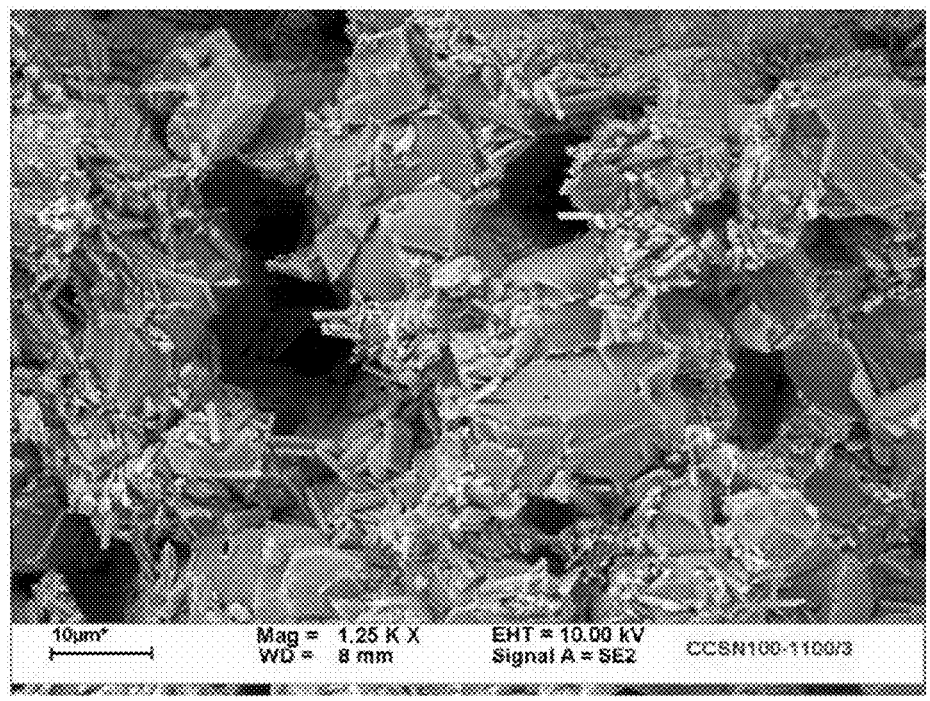
FIG. 14(a)      FIG. 14(b)
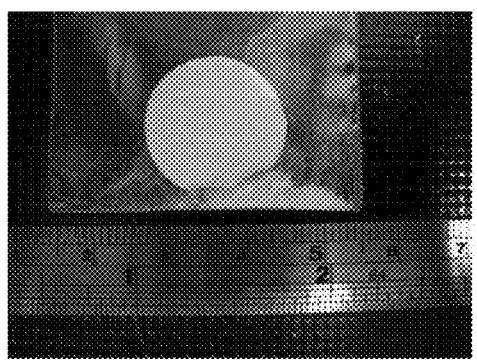 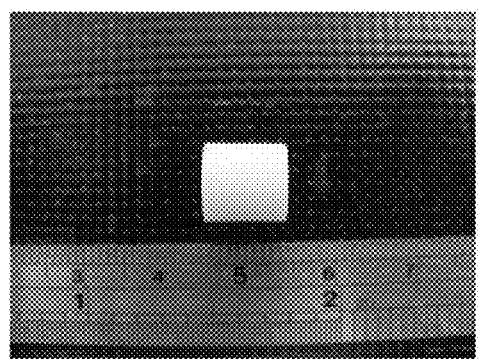

SINTERABLE BIOCERAMICS AND METHOD OF MANUFACTURING THE SAME

This application claims priority of No. 098100973 filed in Taiwan R.O.C. on Jan. 12, 2009 and priority of No. 098125273 filed in Taiwan R.O.C. on Jul. 28, 2009 under 35 USC 119, the entire contents of which are hereby incorporated by reference.

BACKGROUND OF THE INVENTION

1. Field of the Invention

The present invention relates to calcium sulfate based biomaterials, and methods for making such materials. These materials can be used as bone substitutes. In particular, the strength of the calcium sulfate added with sintering additives after firing is satisfactory. In addition, these materials show good biocompatibility.

2. Related Art

The volume and weight of the bones occupy the most parts of human's body. The main function of bones is to assist our bodies to take action and to support the body structure. As the flaw or damage is formed in bones, the clinical treatment is often required. The reasons causing such serious damages on bones are bone fractures, or bone tumor, or osteomyelitis, or collapses of vertebra, or the flawed hip bone, or the failed artificial joint. In order to resolve these damages, to replace the damaged bone with bone graft is still a common treatment in the clinics.

Nowadays, the bone graft comes from autograft and allograft. Autograft means the transplantation of organs, tissues or even proteins from one part of the body to another part in the same individual. This is a rather safe treatment. It may induce a good recovery. However, the source of autograft is limited. In addition, the elders, children or people who are not healthy are not suitable for such autograft treatment. Allograft means the transplantation of cells, tissues, or organs, sourced from the same species of a genetically non-identical human body. The bone graft in allograft may come from the bone bank. However, the quality of bones is questionable. For example, the disease, such as AIDS or hepatitis etc., may come with the surgery. In order to avoid the limitation and risk of autograft and allograft, using the artificial bone substitutes is becoming a popular alternative. Many medical companies in the world have therefore put their attention on developing bone substitutes.

The first bone graft was generated from Netherlands, by JobVan Meekren in 1668. In the $19^{th}$ century, many doctors cured the fractures and damages of bones by using autograft. The results of surgeries were very successful. Till now, the technology of autograft is not changed too much, compared with that developed 100 hundred years ago.

Polymeric bone cement has been used as filler in orthopedics for quite a while. Since 1960, polymethylmethacrylate acid has been used to fill into the cavity between the artificial joint and bone tissue. It can fix the artificial joint in the bone tissue. Such bone cement has good fixing effect in the early stage; however, after implanting for a long time, the implanted component becomes loose because of stress shielding and foreign body reaction. In addition, one more operation is often needed to perform on 70% of the patient after implanting for 10 years. This circumstance results in wasting of money and inconvenience for doctors and patients. Although the bone cement can avoid the soft tissue to grow into defects and holes of bones, it still cannot be absorbed by human's body. The bone cement also can not be transferred into bone tissue. Furthermore, the high temperature and residual monomer generated during mixing bone cement will cause the death and toxic pollution of surrounding tissue. Therefore, many medical teams intend to use the absorbable bone substitutes, such as natural coral, hydroxyapatite, calcium phosphate, hemihydrate calcium sulfate or its mixture, to replace the traditional bone cement.

Calcium sulfate is massively used as the shaping molds in ceramic industry. The porous calcium sulfate can absorb water, but its strength is low. Therefore, the service lifespan of calcium sulfate used as molds is limited. If the strength of calcium sulfate can be improved, the service time will be extended. In addition, the calcium sulfate can be used as bulks and films in orthopedics because it has good biocompatibility and bio-degradability. However, the application of calcium sulfate is limited because it cannot be sintered and its strength is thus low.

Nowadays, the calcium sulfate products are made at room temperature (without sintering/heat treatment). This is the reason why the strength of calcium sulfate is poor after heat treatment. This is also the reason why the amount of calcium sulfate products is used less than that of calcium phosphate products used in the medical area.

SUMMARY OF THE INVENTION

Hereby, the present invention discloses a sinterable calcium sulfate and a method of manufacturing the same. Some sintering additives are added into calcium sulfate to improve its sintering ability. The presence of these sintering additives should not affect the biocompatibility of calcium sulfate. The materials thus have appropriate strength and biocompatibility after heat treatment, which can be used as biomaterials.

This method is prepared by pre-mixing +1 and/or +2 and/or +3 and/or +4 and/or +5 valence elements and/or their chemical compounds into calcium sulfate as sintering additives. The chemical compounds include oxide compounds, non-oxide compounds, intermetallic compounds, amphoteric compound, metal-like compounds, stoichiometric compound, non-stoichiometric compounds, mixed-valence-state compounds, glass, glass-ceramics etc. During firing samples at or above the temperature of 600° C., these sintering additives assist the densification of calcium sulfate. The strength and biocompatibility of specimens are satisfactory. Thereby, these calcium sulfate-based ceramics can be used as bone substitutes.

In the present invention, the sintering additives can be +1 and/or +2 and/or +3 and/or +4 and/or +5 valence elements and/or their compounds, which can also form glass or glass-ceramic materials during sintering. The mixtures comprise calcium sulfate and 0.1 to 50 wt % sintering additives. The mixtures are shaped in the mold. During sintering at elevated temperatures, the sintering additives can form glass or glass-ceramic or compound to assist the densification of calcium sulfate. The calcium sulfate ceramics after sintering have the maximum compressive strength of 183 MPa. These materials can be used as bone substitutes.

The traditional procedure of manufacturing glass is complex. For example: the glass starting materials (e.g. $SiO_2$, $CaO$, $Na_2O$ etc.) are first heated up at the high temperature, and then quenched, ground and sieved. After that, the ceramic powder and glass are mixed together, shaped and fired. The glass or glass-ceramic specimens eventually can be obtained. However, the ceramics and glass starting materials are directly mixed together in the present invention. The mixture is then shaped and fired. The specimens containing glass can also be made without using the above-mentioned complex pre-treatments. The sintering additives disclosed in the present invention can form glass or glass-ceramic by firing with calcium sulfate at elevated temperatures. Compared with the traditional method, it is much easier to prepare the glass or glass-ceramic specimens by using the method used in the present invention.

The scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, wherein:

FIGS. 8(a) to 8(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 1000° C.;

FIG. 13 depicts the SEM micrograph of the specimen after firing at 1100° C., wherein the specimen comprises calcium sulfate+1 wt % sodium hydrogen carbonate+5 wt % silica+ 9.4 wt % calcium oxide;

FIGS. 14(a) and 14(b) respectively depict the photographs of (a) calcium sulfate, (b) calcium sulfate+0.15 wt % phosphorus pentoxide+0.26 wt % calcium oxide+0.59 wt % silica specimens after firing at 1100° C.;

DETAILED DESCRIPTION OF THE INVENTION

The present invention will be apparent from the following detailed description, which proceeds with reference to the accompanying drawings, wherein the same references relate to the same elements.

Hereinafter, the present invention will be described more clearly as follows.

Figure 1:
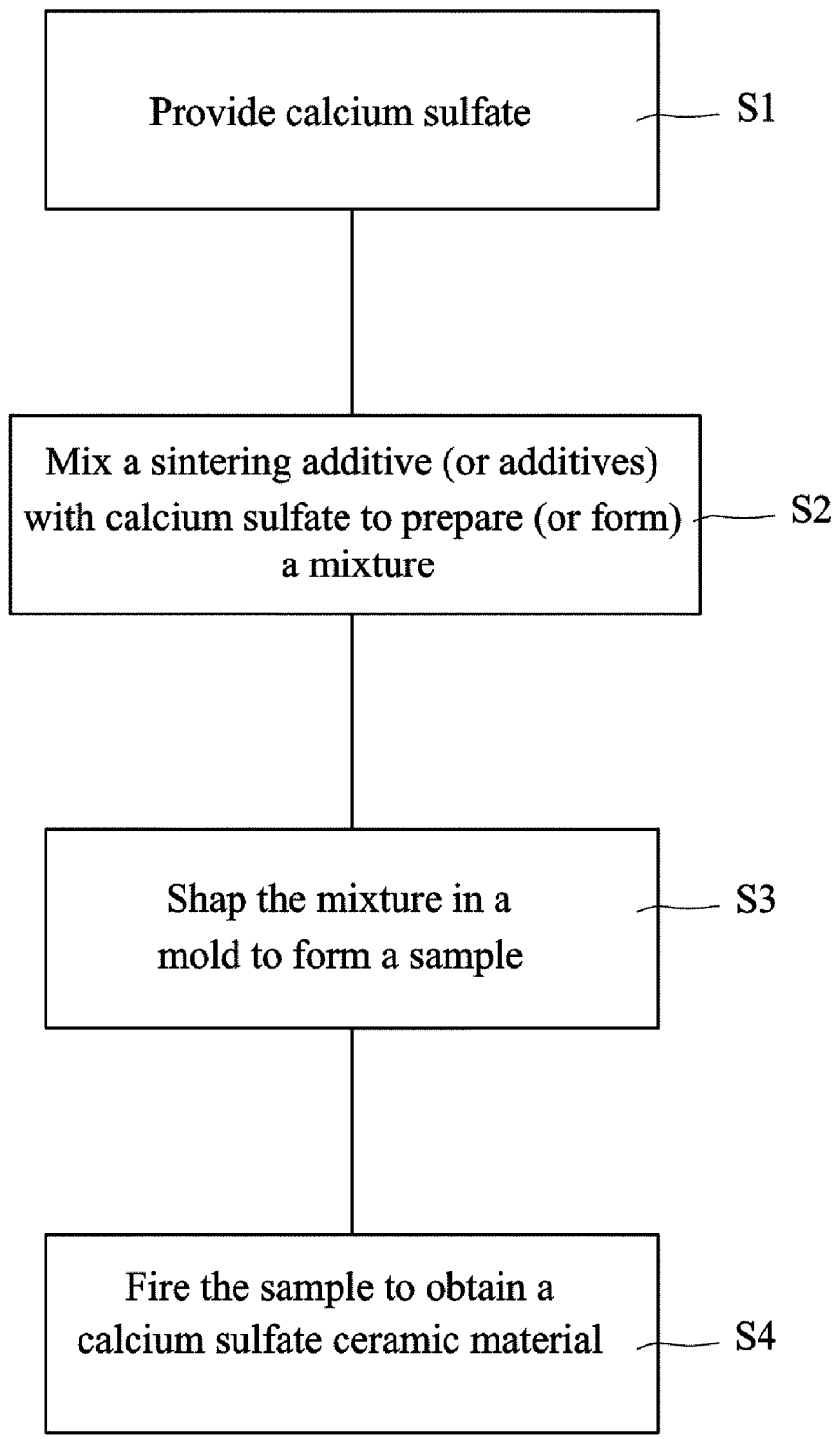
FIG. 1 depicts the flowchart of the present invention.
Figure 2A:
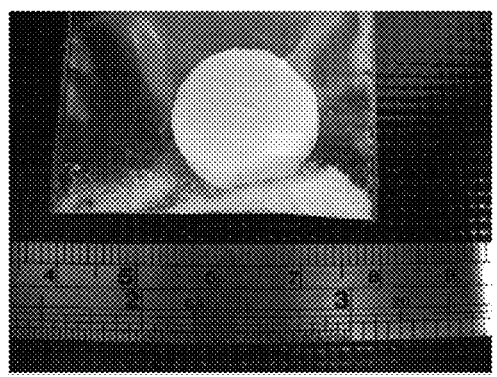
FIGS. 2(a) to 2(d) respectively depict the photographs of (a) calcium sulfate, (b) calcium sulfate+1 wt % silica, (c) calcium sulfate+10 wt % silica and (d) calcium sulfate+50 wt % silica specimens after firing at 900° C.
Figure 2B:
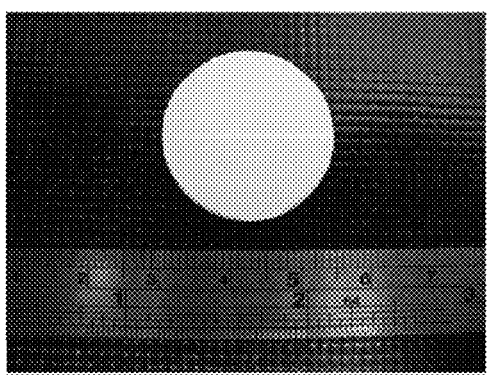
Figure 2C:
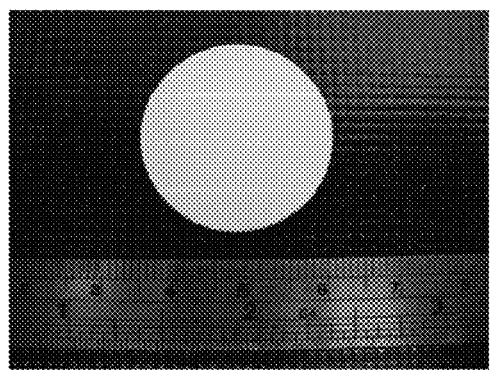
Figure 2D:
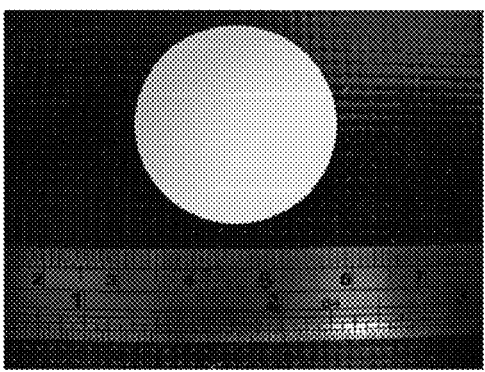
Figure 3A:
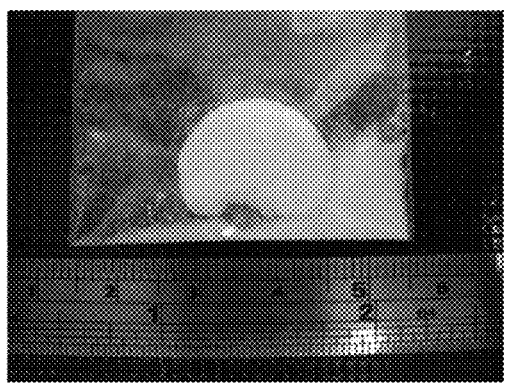
FIGS. 3(a) to 3(d) respectively depict the photographs of (a) calcium sulfate, (b) calcium sulfate+1 wt % silica, (c) calcium sulfate+10 wt % silica and (d) calcium sulfate+50 wt % silica specimens after firing at 1000° C.
Figure 3B:
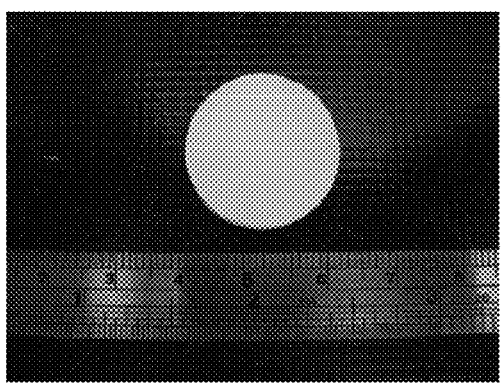
Figure 3C:
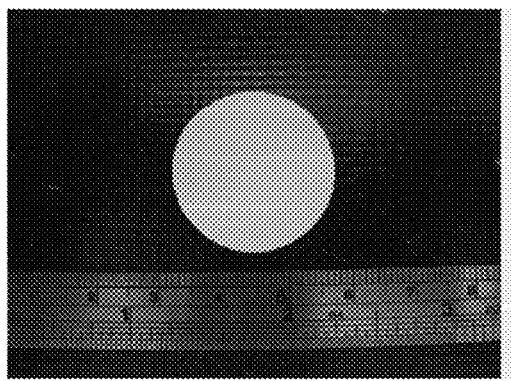
Figure 3D:
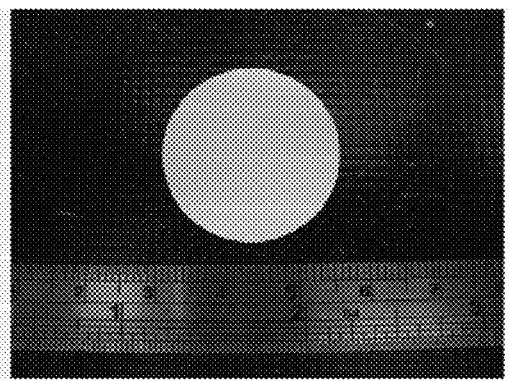
Figure 4A:
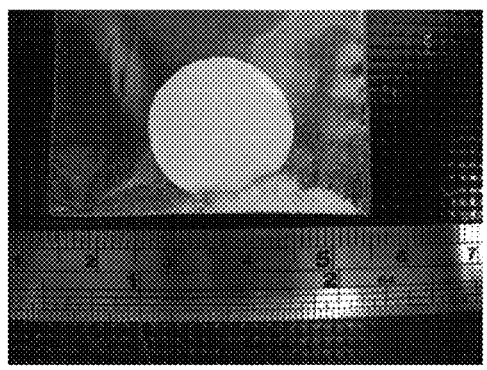
FIGS. 4(a) to 4(d) respectively depict the photographs of (a) calcium sulfate, (b) calcium sulfate+1 wt % silica, (c) calcium sulfate+10 wt % silica and calcium sulfate+50 wt % silica specimens after firing at 1100° C.
Figure 4B:
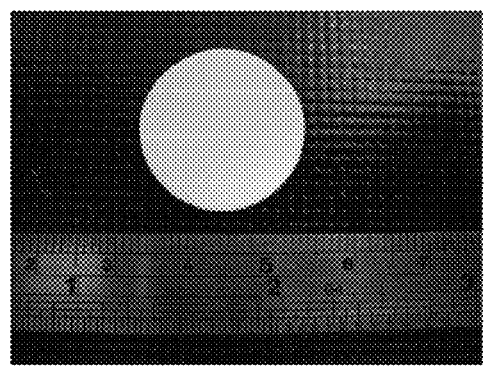
Figure 4C:
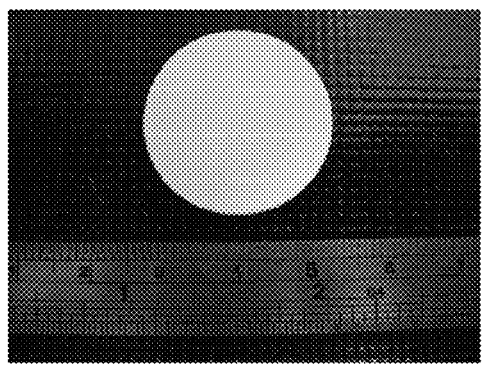
Figure 4D:
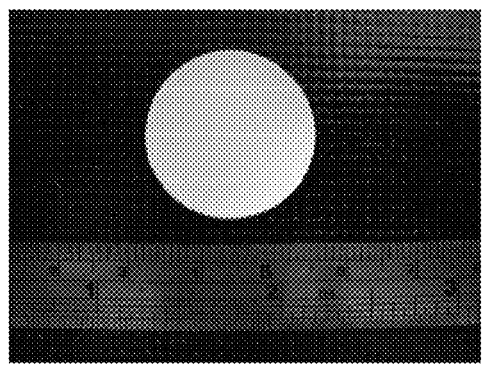
Figure 5A:
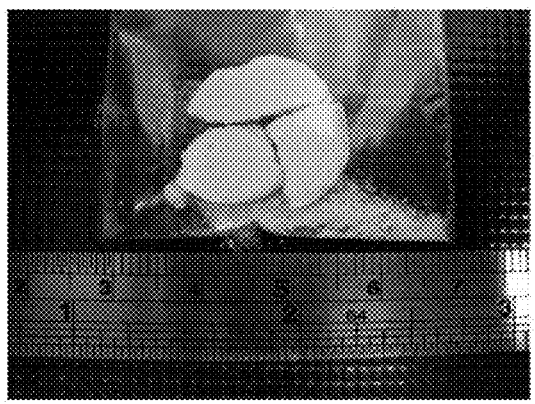
FIGS. 5(a) to 5(d) respectively depict the photographs of (a) calcium sulfate, (b) calcium sulfate+1 wt % silica, (c) calcium sulfate+10 wt % silica and (d) calcium sulfate+50 wt % silica specimens after firing at 1200° C.
Figure 5B:
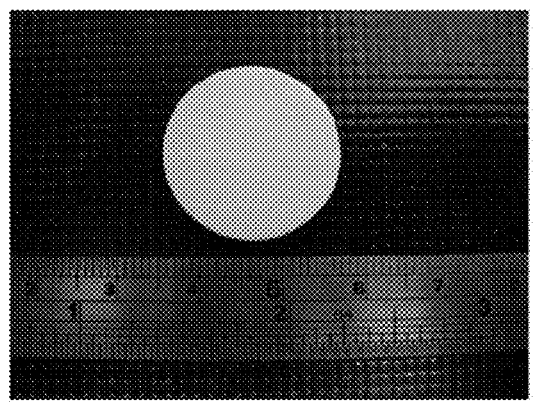
Figure 5C:
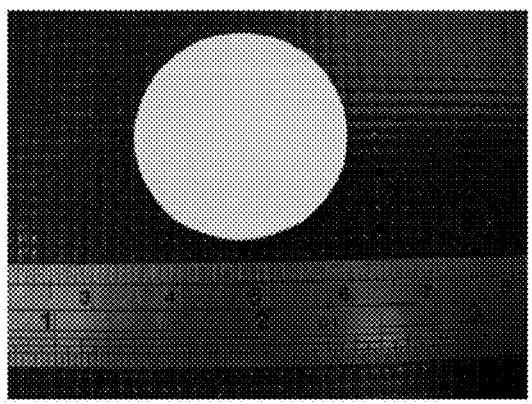
Figure 5D:
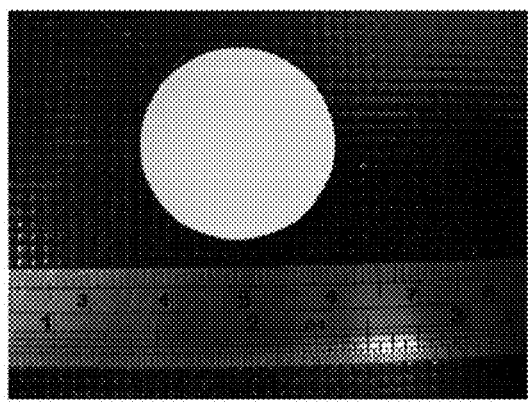

The flowchart of preparation of sinterable bioceramics in the present invention is present in FIG. 1, and the method of manufacturing the sinterable calcium sulfate ceramic material includes the steps S1 to S4.

In the step S1, calcium sulfate is provided.

In the step S2, a sintering additive is mixed with the calcium sulfate to prepare a mixture.

In the step S3, the mixture is shaped in a mold to form a sample (or product).

In the step S4, the sample (or product) is fired at the temperature ranging from 600° C. to 1400° C. to obtain the calcium sulfate ceramic material. Hence, the sintered calcium sulfate ceramic material includes or consists of the calcium sulfate and the sintering additive. The sintering temperature is above 600° C. The optimum sintering temperature is 800° C., 1000° C., 1200° C. or 1400° C.

The sintering additive used in the present invention is selected from the group consisting of a +1 valence element and its compound, a +2 valence element and its compound, a +3 valence element and its compound, a +4 valence element and its compound and a +5 valence element and its compound. That is, the sintering additive is selected from the +1 and/or +2 and/or +3 and/or +4 and/or +5 valence elements and/or their chemical compounds. The amount of the sintering additive in the mixture is in a range of 0.1 wt % to 50 wt %. The better amount of sintering additive is in a range of 0.5 wt % to 50 wt %; and the optimum amount of sintering additive is in a range of 0.5 wt % to 15 wt %. After sintering, the calcium sulfate ceramic material has the optimum flexural strength of about 90 MPa and compressive strength of about 183 MPa.

Hereinafter, a method of the present invention that can improve the sintering ability of calcium sulfate by adding +1 and/or +2 and/or +3 and/or +4 and/or +5 valence elements and/or their chemical compounds is disclosed according to the following examples.

Examples 1 to 6

The materials used in these EXAMPLES were calcium sulfate ($CaSO_4$) powder and +4 valence chemical compounds (e.g. silica, $SiO_2$). First, the calcium sulfate and silica powders were mixed together uniformly. The amounts of silica were 1 wt %, 10 wt % and 50 wt %. The mixed powders were consolidated into discs of 25.4 mm diameter and 3 mm thickness. These disc samples were sintered at 900° C. to 1300° C. for 3 hours. The densities of samples were recorded after sintering, as shown in the Table 1.

TABLE 1

|  |  | $CaSO_4$ | $CaSO_4$ + 1 wt % $SiO_2$ | $CaSO_4$ + 10 wt % $SiO_2$ | $CaSO_4$ + 50 wt % $SiO_2$ |
|---|---|---|---|---|---|
| EXAMPLE 1 | 25° C. density (g/cm³) | 2.1 | 1.5 | 1.7 | 1.5 |
| EXAMPLE 2 | 900° C. density (g/cm³) | / | 1.6 | 1.5 | 1.4 |
| EXAMPLE 3 | 1000° C. density (g/cm³) | / | 2.0 | 1.6 | 1.5 |
| EXAMPLE 4 | 1100° C. density (g/cm³) | / | 2.7 | 1.6 | 1.9 |
| EXAMPLE 5 | 1200° C. density (g/cm³) | / | 2.6 | 1.5 | 1.5 |
| EXAMPLE 6 | 1300° C. density (g/cm³) | / | 2.2 | / | 1.5 |

/: The density of samples cannot be measured due to collapse of the samples.

Hereinbefore, the EXAMPLES show that the density of calcium sulfate ($CaSO_4$) increases after the suitable heat treatment. It indicates that the sintering ability of calcium sulfate can be improved by adding various amounts (1 wt %, 10 wt % and 50 wt %) of +4 valence chemical compounds (e.g. silica, $SiO_2$).

Example 7

The samples for this EXAMPLE of the present invention were prepared using the same method as in EXAMPLE 2. The samples were fired at 900° C. for 3 hours. The photographs of samples are shown in FIGS. 2(a) to 2(d).

Hereinbefore, the EXAMPLE shows that the calcium sulfate samples added with the +4 valence compounds (e.g. $SiO_2$) exhibit better sintering ability during the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 2(a)). It indicates that the sintering ability of calcium sulfate can be improved by adding various amounts (1 wt %, 10 wt % and 50 wt %) of +4 valence chemical compounds (e.g. silica, $SiO_2$).

Example 8

The samples for this EXAMPLE of the present invention were prepared using the same method as in EXAMPLE 3. The samples were fired at 1000° C. for 3 hours. The photographs of samples are shown in FIGS. 3(a) to 3(d).

Hereinbefore, the EXAMPLE shows that the calcium sulfate samples added with the +4 valence compounds (e.g.

$SiO_2$) exhibit improved sintering ability during the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 3(a)). It indicates that the sintering ability of calcium sulfate can be improved by adding various amounts (1 wt %, 10 wt % and 50 wt %) of +4 valence chemical compounds (e.g. silica, $SiO_2$).

Example 9

The samples for this EXAMPLE of the present invention were prepared using the same method as in EXAMPLE 4. The samples were fired at 1100° C. for 3 hours. The photographs of samples are shown in FIGS. 4(a) to 4(d).

Hereinbefore, the example shows that the sintering ability of calcium sulfate samples is improved after adding the +4 valence compounds (e.g. $SiO_2$) and after the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 4(a)). It indicates that the sintering ability of calcium sulfate can be improved by adding various amounts (1 wt %, 10 wt % and 50 wt %) of +4 valence chemical compounds (e.g. silica, $SiO_2$).

Example 10

The samples for this EXAMPLE of the present invention were prepared using the same method as in EXAMPLE 5. The samples were fired at 1200° C. for 3 hours. The photographs of samples are shown in FIGS. 5(a) to 5(d).

Hereinbefore, the example shows that the sintering ability of calcium sulfate samples is improved after adding the +4 valence compounds (e.g. $SiO_2$) and the heat treatment. The amounts of +4 valence compounds are 1 wt %, 10 wt % and 50 wt %. After the heat treatment, the calcium sulfate samples added with the +4 valence compound still hold their shapes. However, the calcium sulfate without the additives collapses after the heat treatment (see FIG. 5(a)). It indicates that the sintering ability of calcium sulfate can be improved by adding various amounts (1 wt %, 10 wt % and 50 wt %) of +4 valence chemical compounds (e.g. silica, $SiO_2$).

Example 11

Figure 6A:
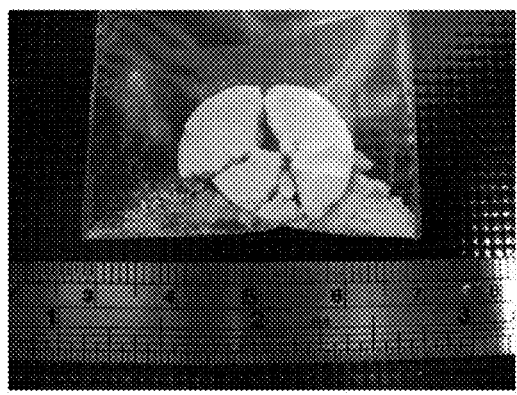
FIGS. 6(a) to 6(c) respectively depict the photographs of (a) calcium sulfate, (b) calcium sulfate+1 wt % silica and (c) calcium sulfate+50 wt % silica specimens after firing at 1300° C.
Figure 6B:
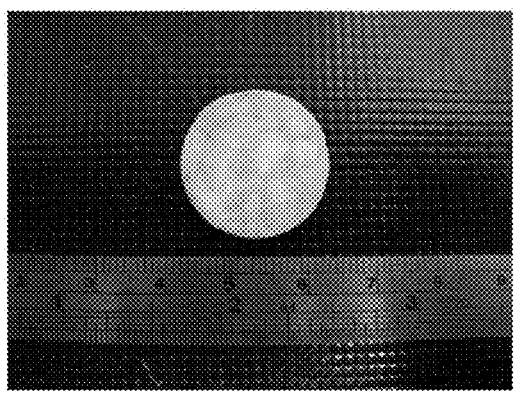
Figure 6C:
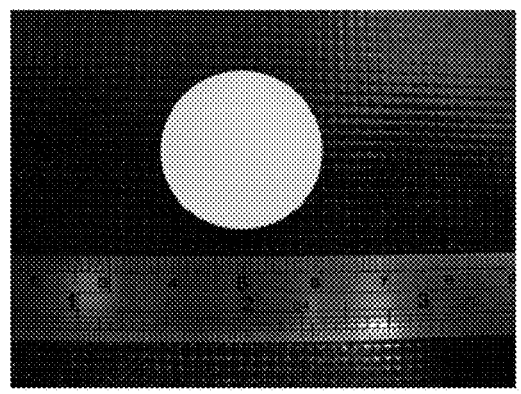
Figure 7A:
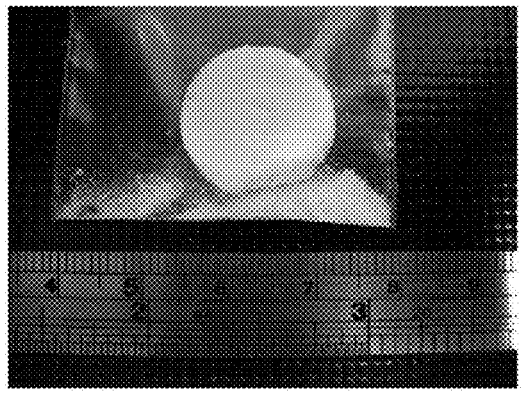
FIGS. 7(a) to 7(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 900° C.
Figure 7B:
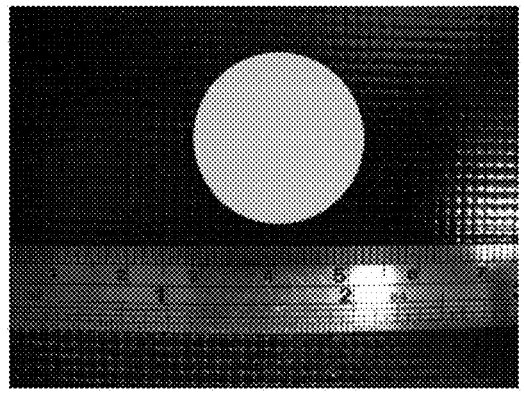
Figure 7C:
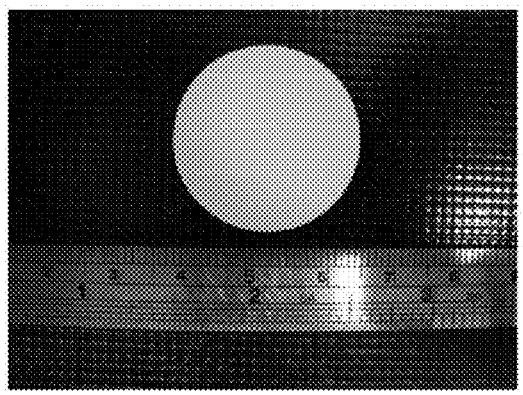
Figure 7D:
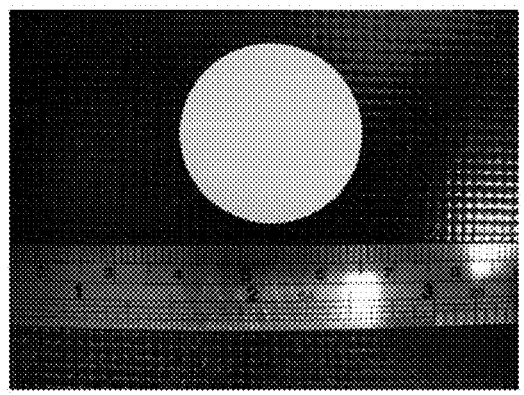
Figure 7E:
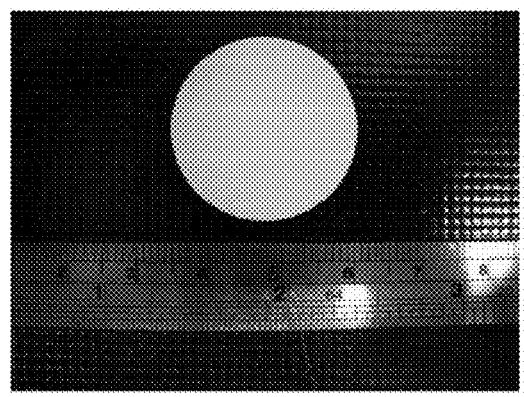
Figure 9A:
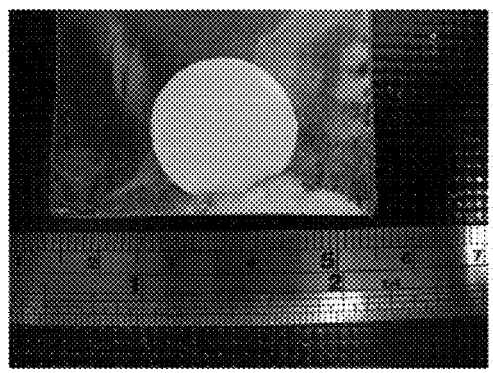
FIGS. 9(a) to 9(e) respectively depict the photographs of (a) calcium sulfate, (b) calcium sulfate+5 wt % silica+9.5 wt % sodium hydrogen carbonate, (c) calcium sulfate+5 wt % silica+9.5 wt % calcium oxide, (d) calcium sulfate+5 wt % silica+9.5 wt % aluminum oxide and (e) calcium sulfate+5 wt % silica+9.5 wt % zirconium dioxide specimens after firing at 1100° C.
Figure 9B:
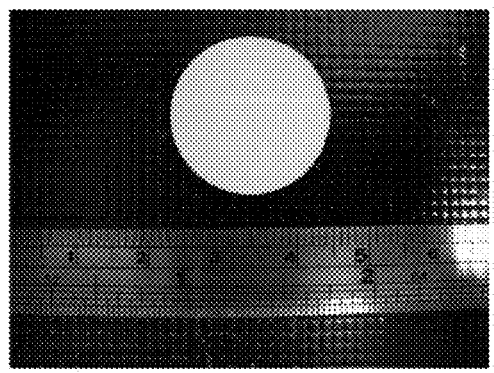
Figure 9C:
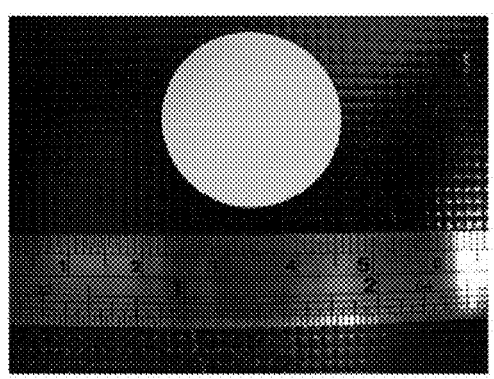
Figure 9D:
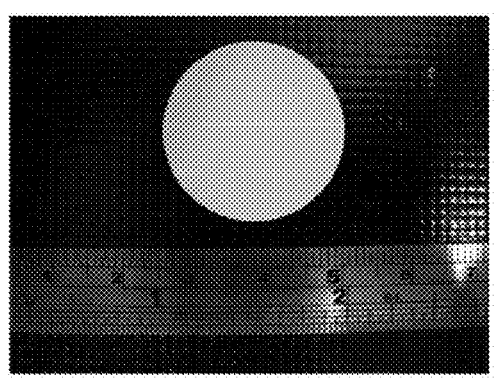
Figure 9E:
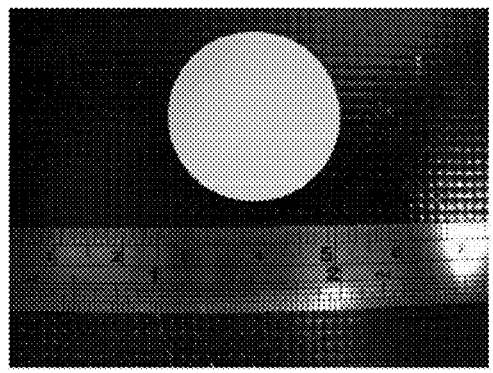
Figure 10A:
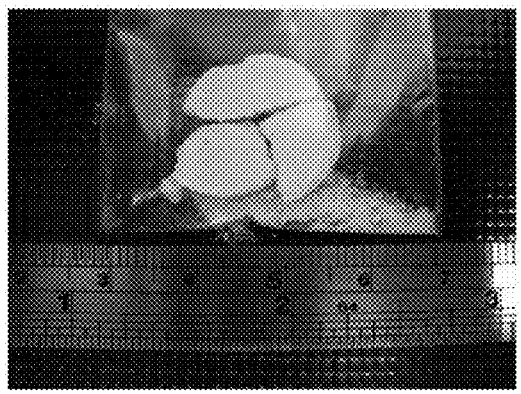
FIGS. 10(a) to 10(d) respectively depict the photographs of (a) calcium sulfate, (b) calcium sulfate+5 wt % silica+9.5 wt % calcium oxide, (c) calcium sulfate+5 wt % silica+9.5 wt % aluminum oxide and (d) calcium sulfate+5 wt % silica+9.5 wt % zirconium dioxide specimens after firing at 1200° C.
Figure 10B:
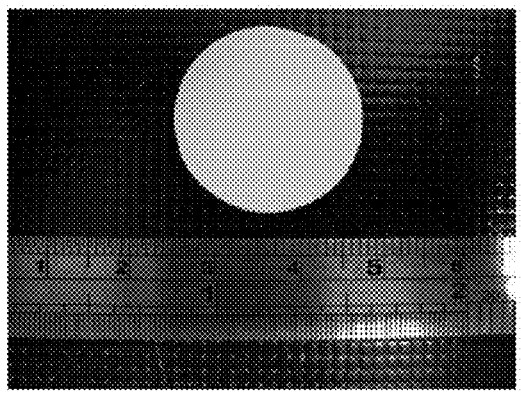
Figure 10C:
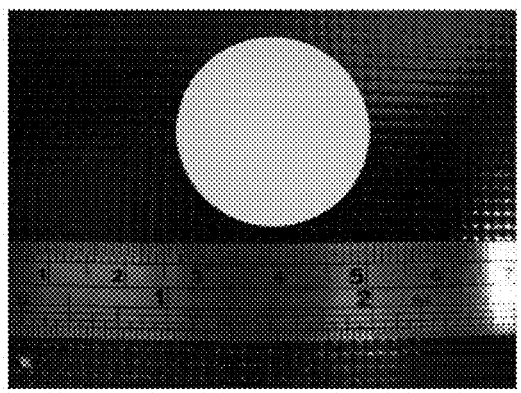
Figure 10D:
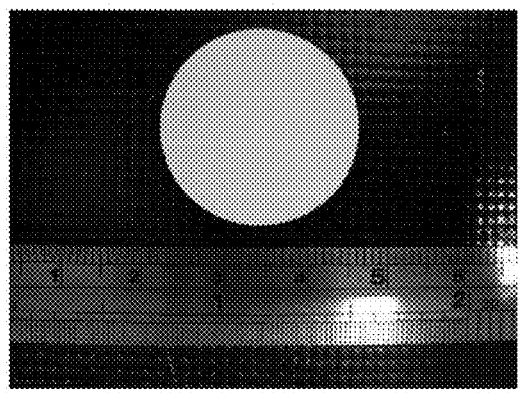
Figure 11A:
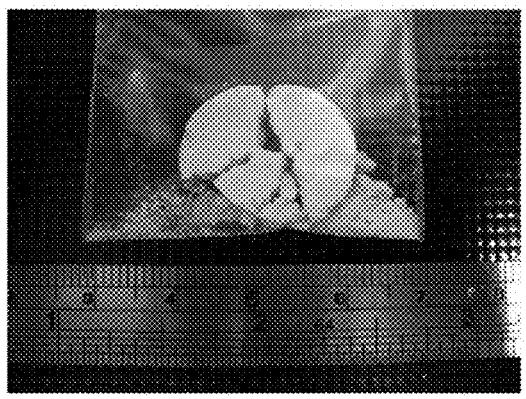
FIGS. 11(a) to 11(d) respectively depict the photographs of (a) calcium sulfate, (b) calcium sulfate+5 wt % silica+9.5 wt % calcium oxide, (c) calcium sulfate+5 wt % silica+9.5 wt % aluminum oxide and (d) calcium sulfate+5 wt % silica+9.5 wt % zirconium dioxide specimens after firing at 1300° C.
Figure 11B:
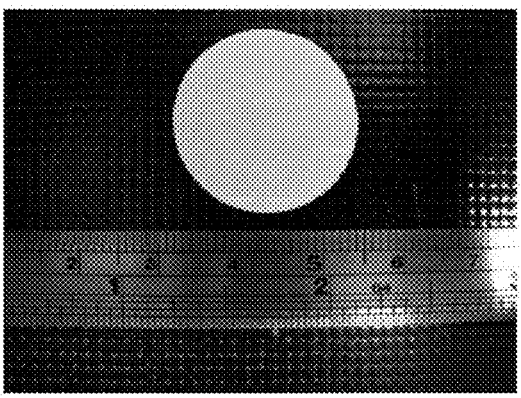
Figure 11C:
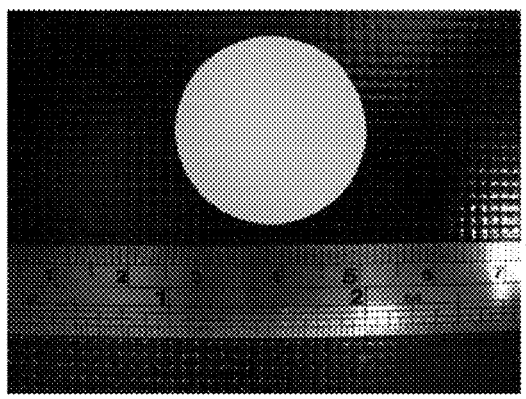
Figure 11D:
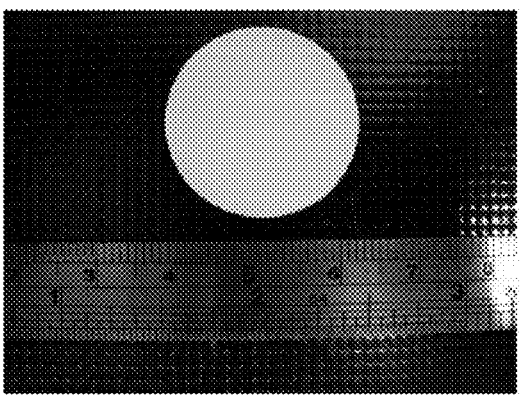

The samples for this EXAMPLE of the present invention were prepared using the same method as in EXAMPLE 6. The samples were fired at 1300° C. for 3 hours. The photographs of samples are shown in FIGS. 6(a) to 6(c).

Hereinbefore, the example shows that the sintering ability of calcium sulfate samples is improved after adding the +4 valence compounds (e.g. $SiO_2$) and the heat treatment. The amounts of +4 valence compounds are 1 wt % and 50 wt %. After the heat treatment, the calcium sulfate samples added with the +4 valence compound still hold their shapes. However, the calcium sulfate without the additives collapses after the heat treatment (see FIG. 6(a)). It indicates that the sintering ability of calcium sulfate can be improved by adding various amounts (1 wt % and 50 wt %) of +4 valence chemical compounds (e.g. silica, $SiO_2$).

Examples 12 to 16

The disc samples for these EXAMPLES of the present invention were prepared using the same methods as in EXAMPLES 2 to 6. The samples were fired at 900° C. to 1300° C. for 3 hours. The samples were then ground to obtain flat surfaces. The flexural strength of disc samples was measured by using the biaxial 4-ball bending test (instrument: MTS810, MTS Co., USA) at the room temperature. The displacement rate was 0.48 mm/min. The flexural strength of samples is presented in the Table 2.

TABLE 2

|  |  | $CaSO_4$ | $CaSO_4$ + 1 wt % $SiO_2$ | $CaSO_4$ + 10 wt % $SiO_2$ | $CaSO_4$ + 50 wt % $SiO_2$ |
| --- | --- | --- | --- | --- | --- |
| EXAMPLE 12 | 900° C./flexural strength (MPa) | / | 3.1 | 2.8 | 8.9 |
| EXAMPLE 13 | 1000° C./flexural strength (MPa) | / | 17.0 | 7.5 | 26.0 |
| EXAMPLE 14 | 1100° C./flexural strength (MPa) | / | 41.0 | 12.9 | 39.1 |
| EXAMPLE 15 | 1200° C./flexural strength (MPa) | / | 26.1 | 22.2 | 90.4 |
| EXAMPLE 16 | 1300° C./flexural strength (MPa) | / | 17.0 | / | 81.1 |

/: The flexural strength of samples cannot be measured due to the collapse of the samples.

Hereinbefore, the EXAMPLES show that the flexural strength of pure calcium sulfate ($CaSO_4$) cannot be measured owing to the collapse of samples. It indicates that the pure calcium sulfate cannot be sintered by using only the heat treatment. However, the flexural strength of the $CaSO_4$ samples added with the +4 valence compound (e.g. $SiO_2$) increases after the heat treatment. The amounts of +4 valence compounds are 1 wt %, 10 wt % and 50 wt %. For certain condition, the flexural strength of samples is about 90 MPa. It indicates that the sintering ability of calcium sulfate can be improved by adding various amounts (1 wt %, 10 wt % and 50 wt %) of +4 valence chemical compounds (e.g. silica, $SiO_2$).

Hereinbefore, the EXAMPLES present that only one element or its compound is added into the calcium sulfate. Hereinafter, the EXAMPLES show that two kinds of sintering additives also can be added into calcium sulfate to improve the sintering ability of calcium sulfate. All the materials used in the following EXAMPLES of the present invention are calcium sulfate ($CaSO_4$) powder, +1 valence compound (e.g. sodium hydrogen carbonate, $NaHCO_3$), +2 valence compound (e.g. calcium oxide, CaO), +3 valence compound (e.g. aluminum oxide, $Al_2O_3$) and +4 valence compound (e.g. zirconium oxide, $ZrO_2$ and silica, $SiO_2$). The two kinds of sintering additives are chosen from any +1 and/or +2 and/or +3 and/or +4 and/or +5 valence chemical compounds. The chemical compounds mentioned hereinbefore can be prepared by heating up the elements in air.

Examples 17 to 22

The preparation steps for samples in EXAMPLE 17 to 22 are shown below. Firstly, calcium sulfate ($CaSO_4$) was mixed uniformly with 5 wt % $SiO_2$ and +1 valence chemical compound (e.g. $NaHCO_3$) or +2 valence chemical compound (e.g. CaO) or +3 valence chemical compound (e.g. $Al_2O_3$) or +4 valence chemical compound (e.g. $ZrO_2$) respectively. The mixed powders were consolidated into discs of 25.4 mm diameter and 3 mm thickness. These disc samples were sintered at 900° C. to 1300° C. for 3 hours. The densities of samples were recorded after sintering, as shown in the Table 3.

TABLE 3

| | | $CaSO_4$ | $CaSO_4$ + 5 wt % $SiO_2$ and 9.5 wt % $NaHCO_3$ | $CaSO_4$ + 5 wt % $SiO_2$ and 9.5 wt % CaO | $CaSO_4$ + 5 wt % $SiO_2$ and 9.5 wt % $Al_2O_3$ | $CaSO_4$ + 5 wt % $SiO_2$ and 9.5 wt % $ZrO_2$ |
|---|---|---|---|---|---|---|
| EXAMPLE 17 | 25° C. density (g/cm³) | 2.1 | 1.5 | 1.5 | 1.7 | 1.7 |
| EXAMPLE 18 | 900° C. density (g/cm³) | / | 2.0 | 1.2 | 1.5 | 1.6 |
| EXAMPLE 19 | 1000° C. density (g/cm³) | / | 2.0 | 1.3 | 1.7 | 1.7 |
| EXAMPLE 20 | 1100° C. density (g/cm³) | / | 2.5 | 1.8 | 1.7 | 1.8 |
| EXAMPLE 21 | 1200° C. density (g/cm³) | / | / | 2.2 | 1.7 | 1.9 |
| EXAMPLE 22 | 1300° C. density (g/cm³) | / | / | 2.0 | 1.5 | 1.6 |

/: The density of samples cannot be measured due to the collapse of the samples.

Hereinbefore, the EXAMPLES show that the density of calcium sulfate ($CaSO_4$) increases after the suitable heat treatment. It indicates that after the heat treatment, the sintering ability of calcium sulfate can be improved by adding any two kinds of sintering additives selected from +1 and/or +2 and/or +3 and/or +4 valence compounds.

Example 23

The samples for this EXAMPLE of the present invention were prepared using the same method as in EXAMPLE 18. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 900° C. for 3 hours. The photographs of samples are shown in FIGS. 7(a) to 7(e).

Hereinbefore, the EXAMPLE shows that the calcium sulfate samples added with any two kinds of sintering additives exhibit improved sintering ability during the heat treatment. These two kinds of additives are selected form +1 valence compounds (e.g. $NaHCO_3$) or +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 7(a)). It indicates that the sintering ability of calcium sulfate can be improved by adding any two different kinds of additives selected from +1 and/or +2 and/or +3 and/or +4 and/or +5 valence compounds.

Example 24

The samples for this EXAMPLE of the present invention were prepared using the same method as in EXAMPLE 19. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1000° C. for 3 hours. The photographs of samples are shown in FIGS. 8(a) to 8(e).

Hereinbefore, the EXAMPLE shows that the calcium sulfate samples added with any two kinds of sintering additives exhibit improved sintering ability during the heat treatment. These two kinds of additives are selected form +1 valence compounds (e.g. $NaHCO_3$) or +2 valence compounds (e.g. CaO) or +3 valence compounds (e.g. $Al_2O_3$) or +4 valence compounds (e.g. $SiO_2$, $ZrO_2$). After the heat treatment, the calcium sulfate samples added with the sintering additives still hold their shapes. However, the calcium sulfate without the additives collapses after the heat treatment (see FIG. 8(a)). It indicates that the sintering ability of calcium sulfate can be improved by adding any two different kinds of additives selected from +1 and/or +2 and/or +3 and/or +4 valence and/or +5 compounds.

Example 25

The samples for this EXAMPLE of the present invention were prepared using the same method as in EXAMPLE 20. The samples were $CaSO_4$ added 5 wt % $SiO_2$ and 9.5 wt % $NaHCO_3$, $CaSO_4$ added 5 wt % $SiO_2$ and 9.5 wt % CaO, $CaSO_4$ added 5 wt % $SiO_2$ and 9.5 wt % $Al_2O_3$, $CaSO_4$ added 5 wt % $SiO_2$ and 9.5 wt % $ZrO_2$ respectively. These samples were fired at 1100° C. for 3 hours. The photographs of samples are shown in FIGS. 9(a) to 9(e).

Hereinbefore, the EXAMPLE shows that the calcium sulfate samples added with any two kinds of sintering additives exhibit improved sintering ability during the heat treatment.

These two kinds of additives are selected form +1 valence compounds (e.g. NaHCO$_3$) or +2 valence compounds (e.g. CaO) or +3 valence compounds (e.g. Al$_2$O$_3$) or +4 valence compounds (e.g. SiO$_2$, ZrO$_2$). After the heat treatment, the calcium sulfate samples added with the sintering additives still hold their shapes. However, the calcium sulfate without the additives collapses after the heat treatment (see FIG. 9(a)). It indicates that the sintering ability of calcium sulfate can be improved by adding any two different kinds of additives selected from +1 and/or +2 and/or +3 and/or +4 valence and/or +5 compounds.

Example 26

The samples for this EXAMPLE of the present invention were prepared using the same method as in EXAMPLE 21. The samples were CaSO$_4$ added 5 wt % SiO$_2$ and 9.5 wt % CaO, CaSO$_4$ added 5 wt % SiO$_2$ and 9.5 wt % Al$_2$O$_3$, CaSO$_4$ added 5 wt % SiO$_2$ and 9.5 wt % ZrO$_2$ respectively. These samples were fired at 1200° C. for 3 hours. The photographs of samples are shown in FIGS. 10(a) to 10(d).

Hereinbefore, the EXAMPLE shows that the calcium sulfate samples added with any two kinds of sintering additives exhibit improved sintering ability during the heat treatment. These two kinds of additives are selected form +2 valence compounds (e.g. CaO) or +3 valence compounds (e.g. Al$_2$O$_3$) or +4 valence compounds (e.g. SiO$_2$, ZrO$_2$). After the heat treatment, the calcium sulfate samples added with sintering additives still hold their shapes. However, the calcium sulfate without the additives collapses after the heat treatment (see FIG. 10(a)). It indicates that the sintering ability of calcium sulfate can be improved by adding any two different kinds of additives selected from +1 and/or +2 and/or +3 and/or +4 valence and/or +5 compounds.

Example 27

The samples for this EXAMPLE of the present invention were prepared using the same method as in EXAMPLE 22. The samples were CaSO$_4$ added 5 wt % SiO$_2$ and 9.5 wt % CaO, CaSO$_4$ added 5 wt % SiO$_2$ and 9.5 wt % Al$_2$O$_3$, CaSO$_4$ added 5 wt % SiO$_2$ and 9.5 wt % ZrO$_2$ respectively. These samples were fired at 1300° C. for 3 hours. The photographs of samples are shown in FIGS. 11(a) to 11(d).

Hereinbefore, the EXAMPLE shows that the calcium sulfate samples added with any two kinds of sintering additives exhibit improved sintering ability during the heat treatment. These two kinds of additives are selected form +2 valence compounds (e.g. CaO) or +3 valence compounds (e.g. Al$_2$O$_3$) or +4 valence compounds (e.g. SiO$_2$, ZrO$_2$). After the heat treatment, the calcium sulfate samples added with the sintering additives still hold their shapes. However, the calcium sulfate without the additives collapses after the heat treatment (see FIG. 11(a)). It indicates that the sintering ability of calcium sulfate can be improved by adding any two different kinds of additives selected from +1 and/or +2 and/or +3 and/or +4 valence and/or +5 compounds.

Examples 28 to 32

The disc samples for these EXAMPLES of the present invention were prepared using the same methods as in EXAMPLES 18 to 22. The samples were fired at 900° C. to 1300° C. for 3 hours. The samples were then ground to obtain flat surfaces. The flexural strength of disc samples was measured by using the biaxial 4-ball bending test (instrument: MTS810, MTS Co., USA) at the room temperature. The displacement rate was 0.48 mm/min. The flexural strength of samples is presented in the Table 4.

TABLE 4

| | | CaSO$_4$ | CaSO$_4$ + 5 wt % SiO$_2$ + 9.5 wt % NaHCO$_3$ | CaSO$_4$ + 5 wt % SiO$_2$ + 9.5 wt % CaO | CaSO$_4$ + 5 wt % SiO$_2$ + 9.5 wt % Al$_2$O$_3$ | CaSO$_4$ + 5 wt % SiO$_2$ + 9.5 wt % ZrO$_2$ |
|---|---|---|---|---|---|---|
| EXAMPLE 28 | 900° C./ flexural strength (MPa) | / | 44.7 | / | 2.8 | 2.9 |
| EXAMPLE 29 | 1000° C./ flexural strength (MPa) | / | 66.5 | 1.7 | 9.7 | 5.1 |
| EXAMPLE 30 | 1100° C./ flexural strength (MPa) | / | 80 | 15.9 | 19.6 | 15.5 |
| EXAMPLE 31 | 1200° C./ flexural strength (MPa) | / | / | 32 | 16.5 | 25.0 |
| EXAMPLE 32 | 1300° C./ flexural strength (MPa) | / | / | 13.6 | 15.1 | 17.0 |

/: The flexural strength of samples cannot be measured due to the collapse of the samples.

Hereinbefore, the EXAMPLES show that the flexural strength of pure calcium sulfate (CaSO$_4$) cannot be measured owing to the collapse of samples. It indicates that the pure calcium sulfate cannot be sintered by using the heat treatment. However, the flexural strength of CaSO$_4$ added with two different kinds of additives increases after firing at a temperature above 900° C. These two kinds of additives are selected form +1 valence compounds (e.g. NaHCO$_3$) or +2 valence compounds (e.g. CaO) or +3 valence compounds (e.g. Al$_2$O$_3$) or +4 valence compounds (e.g. SiO$_2$, ZrO$_2$). It also indicates that the sintering ability of calcium sulfate can be improved by adding two kinds of compounds selected from +1 and/or +2 and/or +3 and/or +4 valence and/or +5 compounds.

Hereinafter, EXAMPLES reveal that the sintering ability of calcium sulfate can be improved by adding three kinds of additives. The combinations of three kinds of additives are selected from any +1 and/or +2 and/or +3 and/or +4 and/or +5 valence compounds. All the materials used for the EXAMPLES are the calcium sulfate mixed with the composite additives. The three kinds of sintering additives are chosen from +1 valence compound ($NaHCO_3$), +2 valence compound (CaO), +3 valence compound ($Al_2O_3$), +4 valence compound ($SiO_2$) and +5 valence compound ($P_2O_5$).

Example 33

First, calcium sulfate ($CaSO_4$) was mixed uniformly with 1 wt % of +1 valence chemical compound ($NaHCO_3$), 5 wt % of +4 valence chemical compound ($SiO_2$) and 9.4 wt % of +2 valence chemical compound (CaO). The mixed powders were formed into discs of 20 mm diameter and 5 mm thickness via gelcasting. These disc samples were sintered at 1100° C. for 3 hours. The densities of samples were recorded after sintering, as shown in the Table 5.

TABLE 5

| | | $CaSO_4$ | $CaSO_4$ + 1 wt % $NaHCO_3$ + 5 wt % $SiO_2$ + 9.4 wt % CaO |
|---|---|---|---|
| EXAMPLE 33 | 1100° C. density (g/cm³) | / | 1.7 |

/: The density of samples cannot be measured due to the collapse of the samples.

Hereinbefore, the EXAMPLE shows that the density of $CaSO_4$ added with sintering additives is increased after the addition of the sintering additives. It indicates that after the heat treatment, the sintering ability of calcium sulfate can be improved by adding $NaHCO_3$, $SiO_2$ and CaO. It also means that after the heat treatment, the sintering ability of calcium sulfate can be improved by adding any three kinds of sintering additives selected from +1 and/or +2 and/or +3 and/or +4 and/or +5 valence compounds.

Example 34

Figure 12A:
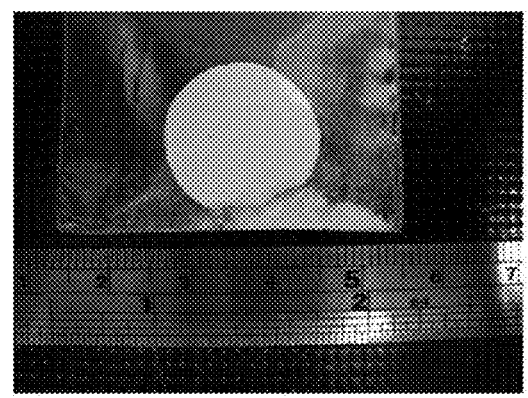
FIGS. 12(a) and 12(b) respectively depict the photographs of (a) calcium sulfate and (b) calcium sulfate+1 wt % sodium hydrogen carbonate+5 wt % silica+9.4 wt % calcium oxide specimens after firing at 1100° C.
Figure 12B:
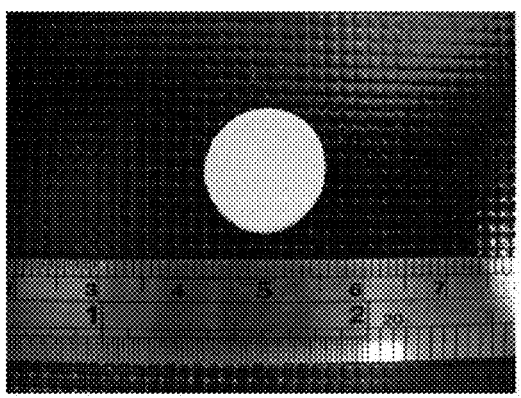
Figure 15A:
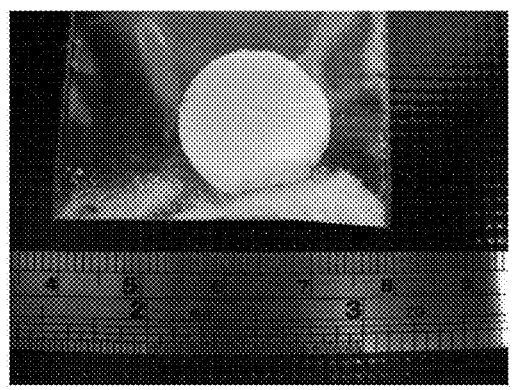
FIGS. 15(a) to 15(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 900° C., wherein SPCN is the combination of $SiO_2$, $P_2O_5$, CaO and $NaHCO_3$.
Figure 15B:
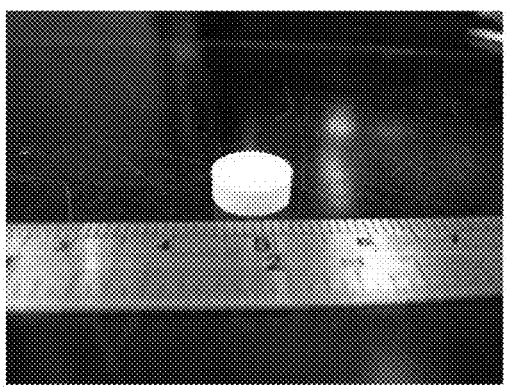
Figure 15C:
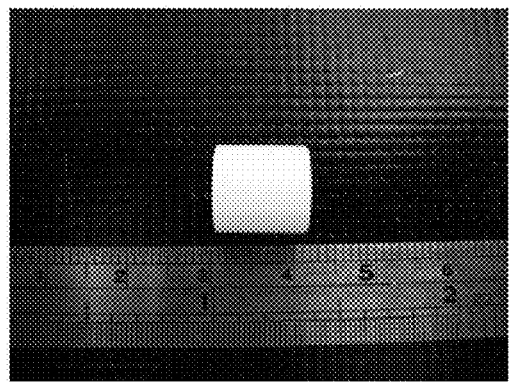
Figure 15D:
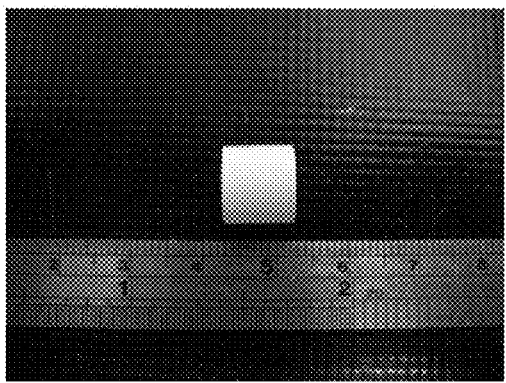
Figure 16A:
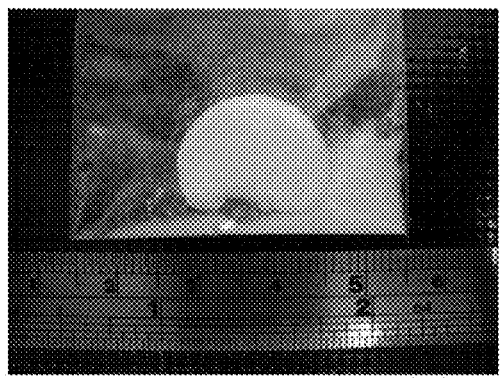
FIGS. 16(a) to 16(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1000° C.
Figure 16B:
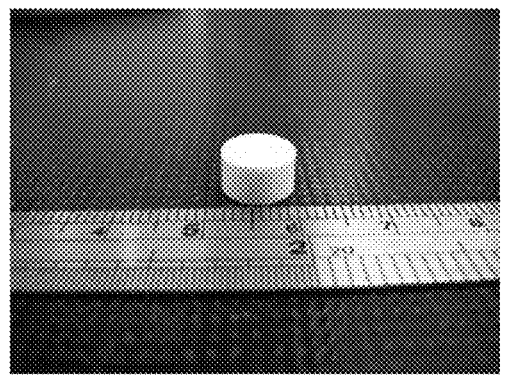
Figure 16C:
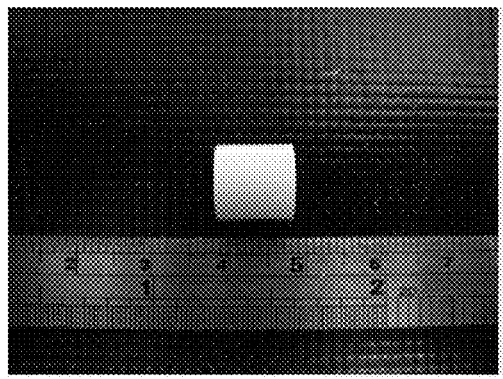
Figure 16D:
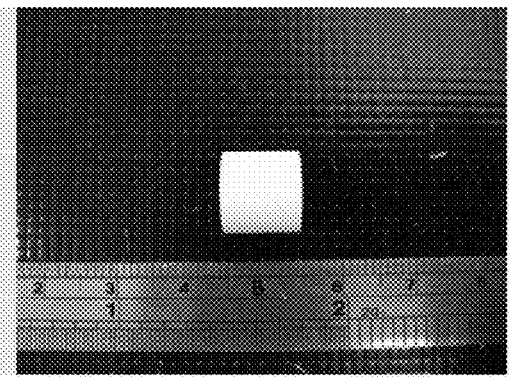
Figure 17A:
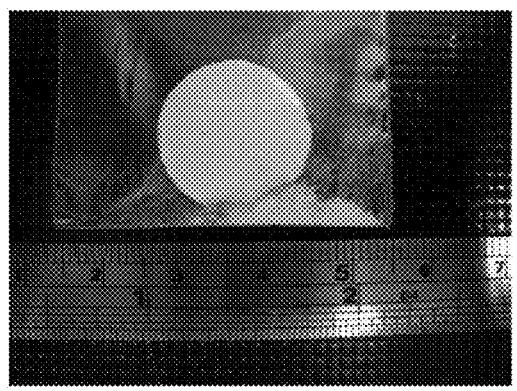
FIGS. 17(a) to 17(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1100° C.
Figure 17B:
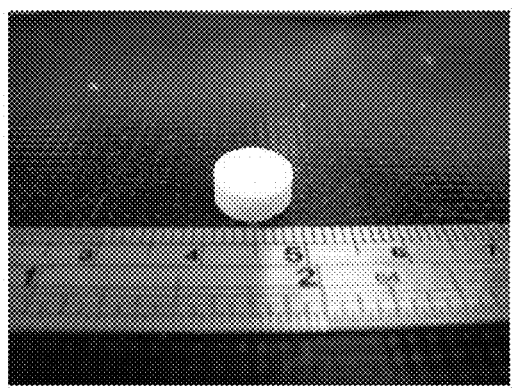
Figure 17C:
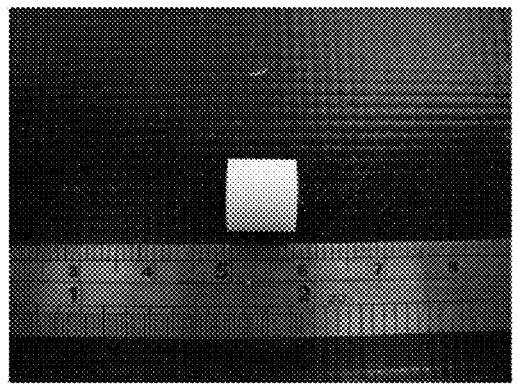
Figure 17D:
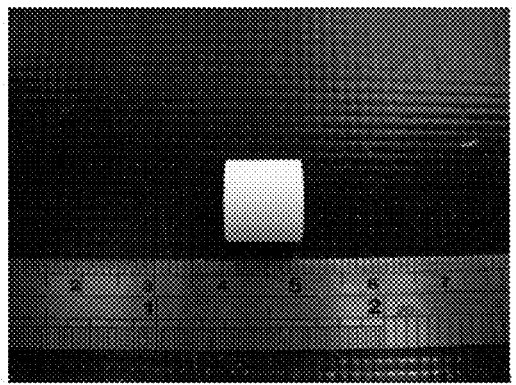
Figure 18A:
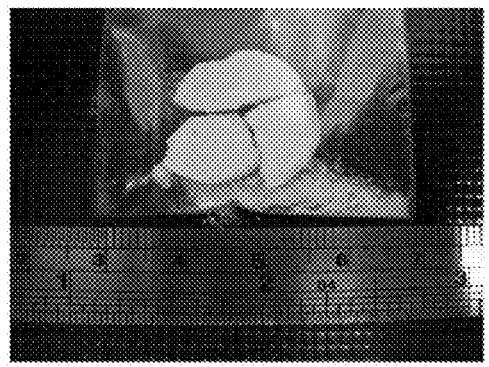
FIGS. 18(a) to 18(d) respectively depict the photographs of (a) calcium sulfate, (b) calcium sulfate+1 wt % starting materials of glass (SPCN), (c) calcium sulfate+10 wt % starting materials of glass (SPCN) and (d) calcium sulfate+50 wt % starting materials of glass (SPCN) specimens after firing at 1200° C.
Figure 18B:
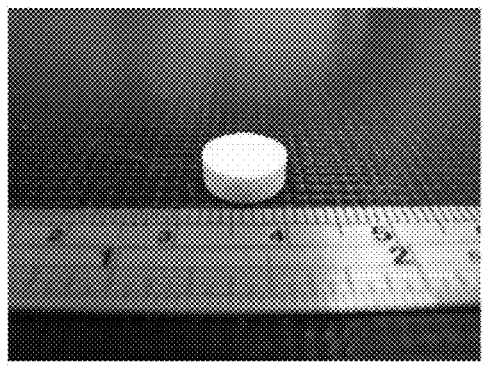
Figure 18C:
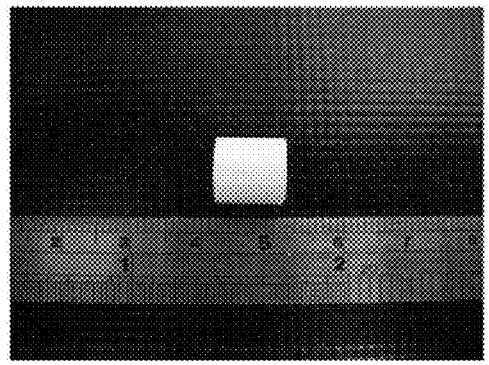
Figure 18D:
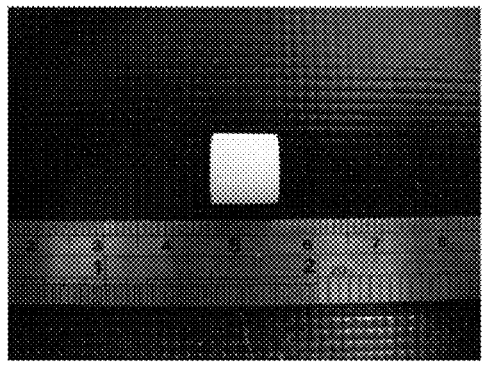
Figure 19A:
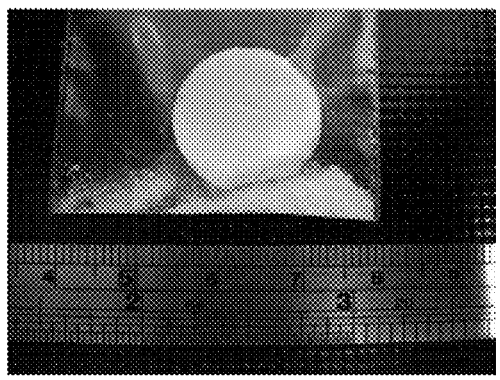
FIGS. 19(a) to 19(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 900° C., wherein SP is the combination of $SiO_2$ and $P_2O_5$; SPN is the combination of $SiO_2$, $P_2O_5$ and $NaHCO_3$; SPC is the combination of $SiO_2$, $P_2O_5$ and CaO; and SPCN is the combination of $SiO_2$, $P_2O_5$, CaO and $NaHCO_3$.
Figure 19B:
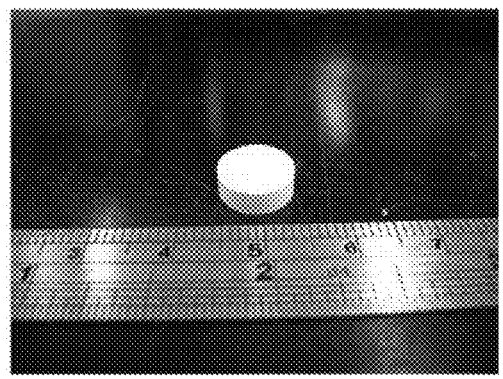
Figure 19C:
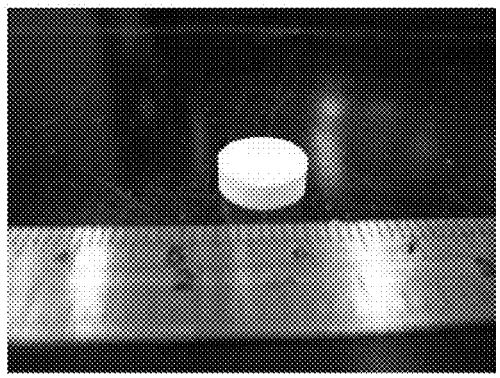
Figure 19D:
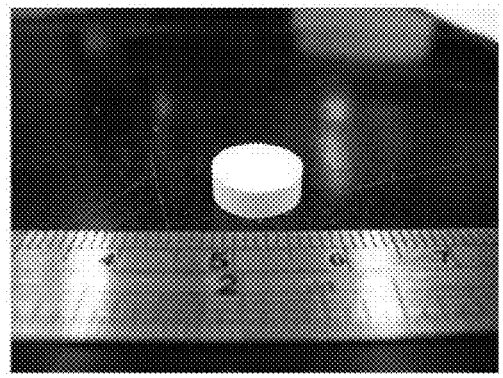
Figure 19E:
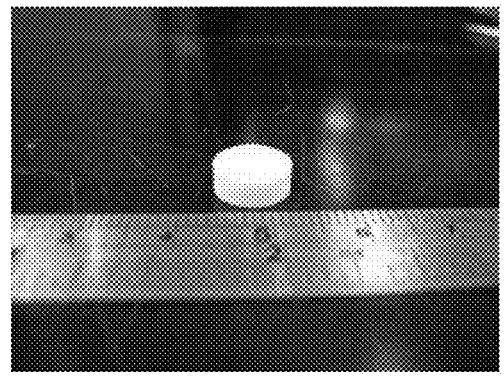
Figure 20A:
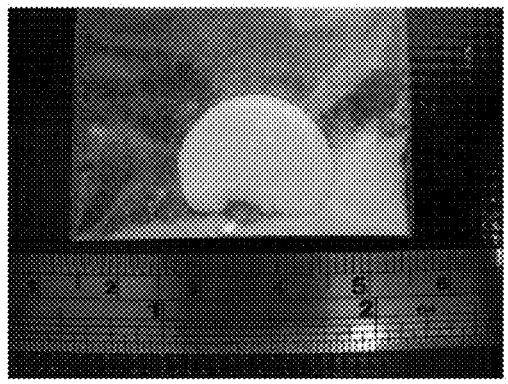
FIGS. 20(a) to 20(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1000° C.
Figure 20B:
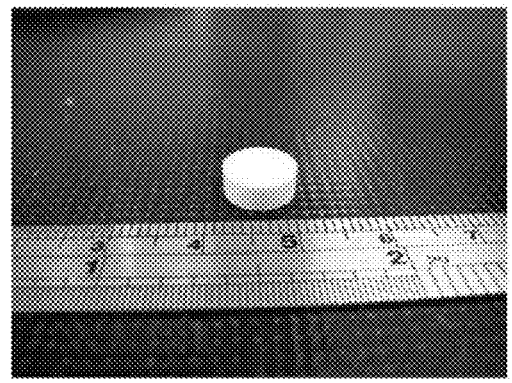
Figure 20C:
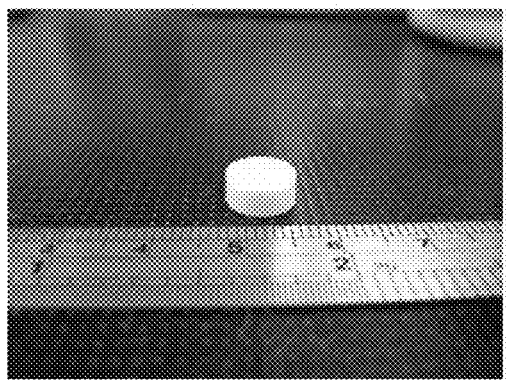
Figure 20D:
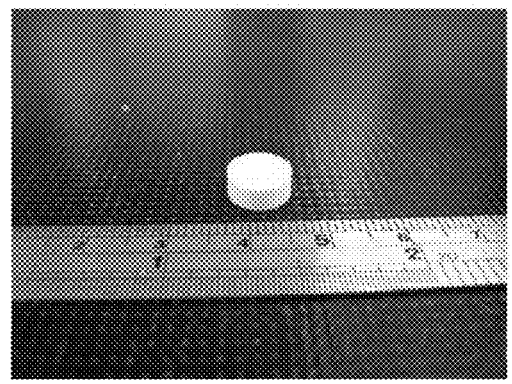
Figure 20E:
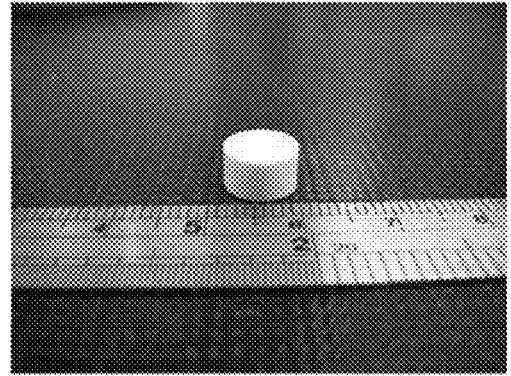
Figure 21A:
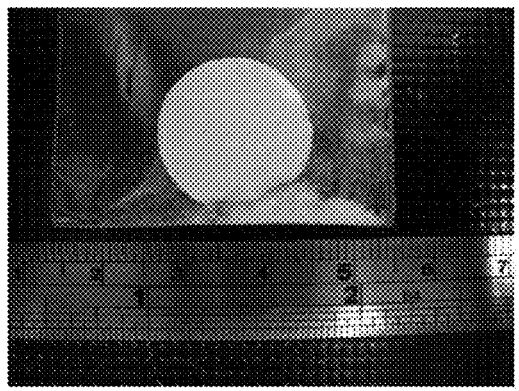
FIGS. 21(a) to 21(e) respectively depict the photographs of (a) calcium sulfate, (b) calcium sulfate +1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1100° C.
Figure 21B:
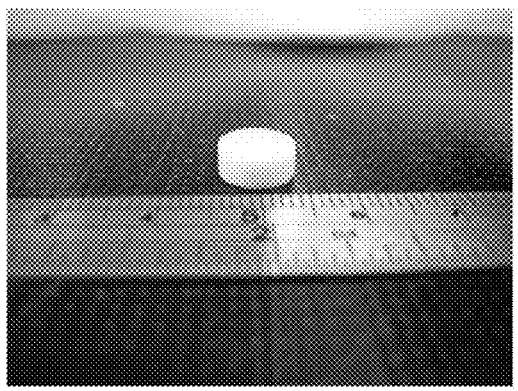
Figure 21C:
Figure 21D:
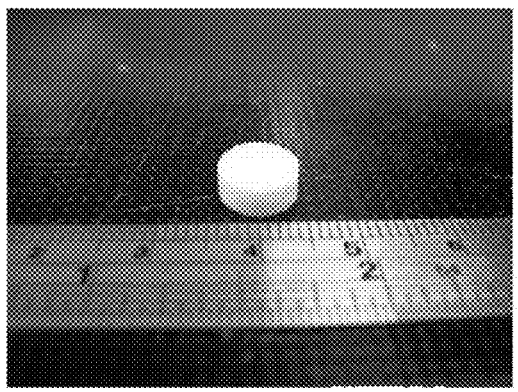
Figure 21E:
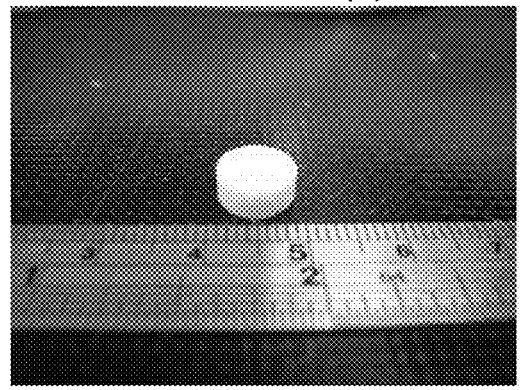
Figure 22A:
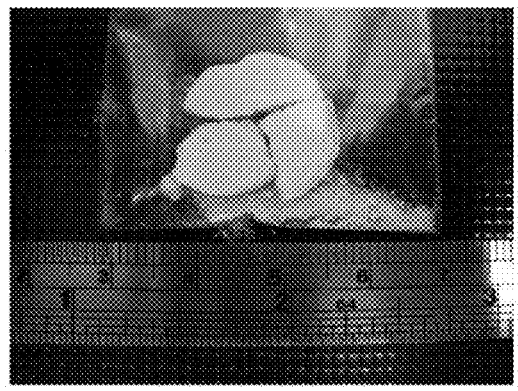
FIGS. 22(a) to 22(e) respectively depict the photographs of (a) calcium sulfate, (b) calcium sulfate+1 wt % starting materials of glass (SP), (c) calcium sulfate+1 wt % starting materials of glass (SPN), (d) calcium sulfate+1 wt % starting materials of glass (SPC) and (e) calcium sulfate+1 wt % starting materials of glass (SPCN) specimens after firing at 1200° C.
Figure 22B:
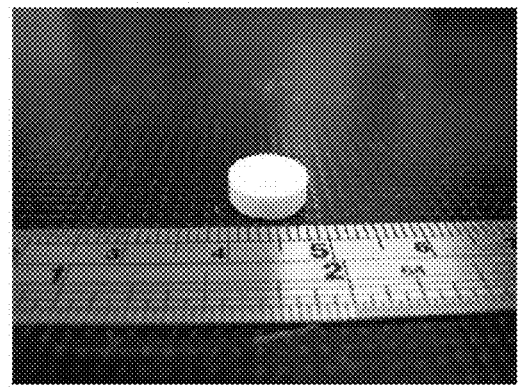
Figure 22C:
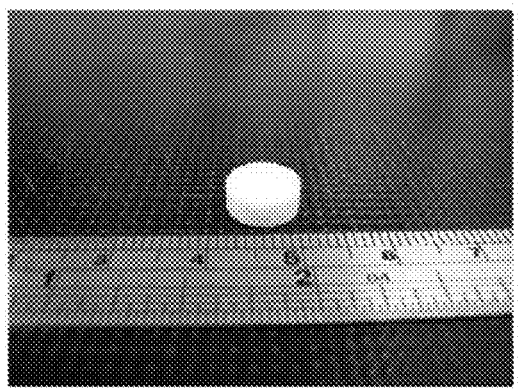
Figure 22D:
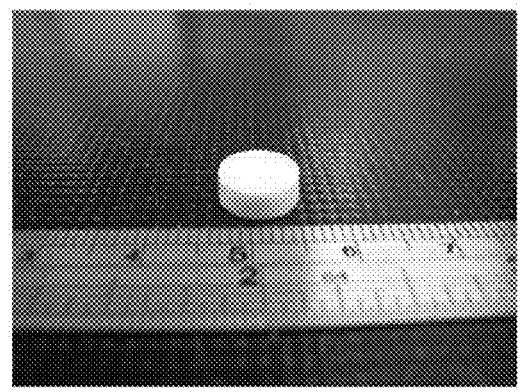
Figure 22E:
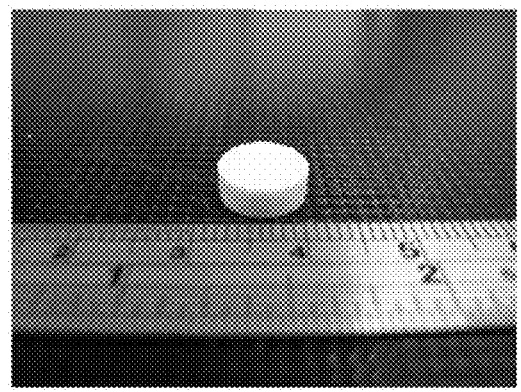

The sample for this EXAMPLE of the present invention was prepared using the same method as in EXAMPLE 33. The compositions of samples were $CaSO_4$ added 1 wt % $NaHCO_3$, 5 wt % $SiO_2$ and 9.4 wt % CaO. These samples were fired at 1100° C. for 3 hours. The photographs of samples are shown in FIGS. 12($a$) and 12($b$).

Hereinbefore, the EXAMPLE shows that the calcium sulfate samples with the added $NaHCO_3$, $SiO_2$ and CaO additives exhibit improved sintering ability during the heat treatment. The sample added with the sintering additives still holds its shape after the heat treatment. However, the calcium sulfate without the additives collapses after the heat treatment (see FIG. 12($a$)). It indicates that the sintering ability of calcium sulfate can be improved by adding any three different kinds of additives selected from +1 and/or +2 and/or +3 and/or +4 and/or +5 valence compounds.

Example 35

The disc samples for these examples of the present invention were prepared using the same methods as in EXAMPLE 33. The samples were fired at 1100° C. for 3 hours. The samples were then ground to obtain flat surfaces. The flexural strength of the disc samples was measured by using the biaxial 4-ball bending test (instrument: MTS810, MTS Co., USA) at the room temperature. The displacement rate was 0.48 mm/min. The flexural strength of the samples is presented in the Table 6.

TABLE 6

| | | $CaSO_4$ | $CaSO_4$ + 1 wt % $NaHCO_3$ + 5 wt % $SiO_2$ + 9.4 wt % CaO |
|---|---|---|---|
| EXAMPLE 35 | 1100° C./ flexural strength (MPa) | / | 24.0 |

/: The flexural strength of samples cannot be measured due to the collapse of the samples.

Hereinbefore, the EXAMPLE shows that the flexural strength of pure calcium sulfate ($CaSO_4$) cannot be measured owing to the collapse of samples. It indicates that the calcium sulfate cannot be sintered by using the heat treatment. However, the flexural strength of $CaSO_4$-based samples is increased via adding three different kinds of additives. These three kinds of additives are $NaHCO_3$, CaO and $SiO_2$. It also indicates that the sintering ability of calcium sulfate can be improved by adding any three kinds of additives selected from +1 and/or +2 and/or +3 and/or +4 and/or +5 valence chemical compounds.

Example 36

The sample for this EXAMPLE of the present invention was prepared using the same method as in EXAMPLE 33. The compositions of samples were $CaSO_4$ added with 1 wt % $NaHCO_3$, 5 wt % $SiO_2$ and 9.4 wt % CaO. These samples were fired at 1100° C. for 3 hours. The SEM micrograph of sample is shown in FIG. 13.

Hereinbefore, the EXAMPLE shows that the calcium sulfate samples added with the $NaHCO_3$, $SiO_2$ and CaO additives exhibit the sintering ability after the heat treatment. It indicates that the sintering ability of calcium sulfate can be improved by adding three different kinds of additives selected from +1 and/or +2 and/or +3 and/or +4 and/or +5 valence compounds.

Example 37

This EXAMPLE reveals that the sintering ability of calcium sulfate also can be improved by adding three kinds of additives. The combinations of three kinds of additives were selected from any +1 and/or +2 and/or +3 and/or +4 and/or +5 valence compounds. All the materials used for the EXAMPLE were the calcium sulfate, +2 valence compound (CaO), +4 valence compound ($SiO_2$) and +5 valence compound ($P_2O_5$). Firstly, the calcium sulfate was uniformly mixed with 0.59 wt % $SiO_2$, 0.15 wt % $P_2O_5$ and 0.26 wt % CaO. The mixed powders were consolidated into cylinder samples of 10 mm diameter and 10 mm height. These cylinder samples were sintered at 1100° C. for 1 hour. The densities of samples were recorded after sintering, as shown in the Table 7.

TABLE 7

| | | $CaSO_4$ | $CaSO_4$ + 0.15 wt % $P_2O_5$ + 0.26 wt % CaO + 0.59 wt % $SiO_2$ |
|---|---|---|---|
| EXAMPLE 37 | 1100° C. density (g/cm³) | / | 2.8 |

/: The density of samples cannot be measured due to the collapse of the samples.

Hereinbefore, the EXAMPLE reveals that after the heat treatment, the density of calcium sulfate is increased by adding $SiO_2$, $P_2O_5$ and CaO. It means that calcium sulfate exhibits the sintering ability by adding $SiO_2$, $P_2O_5$ and CaO. It also indicates that the addition of three sintering additives, such as $SiO_2$, $P_2O_5$ and CaO, can assist the densification of calcium sulfate.

Example 38

The sample for this EXAMPLE of the present invention was prepared using the same method as in EXAMPLE 37. The compositions of sample were $CaSO_4$ added with 0.15 wt % $P_2O_5$, 0.26 wt % CaO and 0.59 wt % $SiO_2$. The sample was fired at 1100° C. for 1 hour. The photographs of samples are shown in FIGS. 14(a) and 14(b).

Hereinbefore, the EXAMPLE shows that the calcium sulfate samples added with $P_2O_5$, CaO and $SiO_2$ additives exhibit the sintering ability after the heat treatment. The sample added with the sintering additives still holds its shape after the heat treatment. However, the calcium sulfate without the additives collapsed after the heat treatment (see FIG. 14(a)). It indicates that the sintering ability of calcium sulfate can be improved by adding any three different kinds of additives selected from +1 and/or +2 and/or +3 and/or +4 and/or +5 valence compounds.

Example 39

The cylinder sample for this EXAMPLE of the present invention was prepared using the same method as in EXAMPLE 37. The compositions of sample were $CaSO_4$ added with 0.15 wt % $P_2O_5$, 0.26 wt % CaO and 0.59 wt % $SiO_2$. The sample was made into cylinder of 10 mm diameter and 10 mm height. The sample was fired at 1100° C. for 1 hour. The sample was first ground to obtain a flat surface, and then the compressive strength of cylinder samples was measured at room temperature by using the universal testing instrument (MTS810, MTS, USA). The displacement rate was 0.96 mm/min during testing. The ratio of diameter to height is 1 to 1. The compressive strength of samples is listed in the Table 8.

TABLE 8

| | | $CaSO_4$ | $CaSO_4$ + 0.15 wt % $P_2O_5$ + 0.26 wt % CaO + 0.59 wt % $SiO_2$ |
|---|---|---|---|
| EXAMPLE 39 | 1100° C./ compressive strength (MPa) | / | 151.9 |

/: The compressive strength of samples cannot be measured due to the collapse of the samples.

Hereinbefore, the example shows that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased via adding three different kinds of additives. These three kinds of additives are $P_2O_3$, CaO and $SiO_2$. It also indicates that the sintering ability of calcium sulfate can be improved by adding any three kinds of sintering additives selected from +1 and/or +2 and/or +3 and/or +4 and/or +5 valence chemical compounds.

In addition, the sintering additives used for the present invention are also selected from +1 and/or +2 and/or +3 and/or +4 and/or +5 valence groups, which can form glass materials after the heat treatment. The glass materials mean that the materials are amorphous in structure. Such materials can flow at elevated temperature. The amount of sintering additives in the mixtures is in the range of 0.1 wt % to 50 wt %. The mixtures are shaped in the molds. After the heat treatment, the compressive strength of $CaSO_4$-based ceramic materials is about 152 MPa.

Hereinafter, EXAMPLES reveals that the sintering ability of calcium sulfate can be improved by adding +1 and/or +2 and/or +3 and/or +4 and/or +5 valence sintering additives. These additives form glass during firing at elevated temperature.

Examples 40 to 44

All the materials used for these EXAMPLES of the present invention were calcium sulfate ($CaSO_4$), +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). First, $CaSO_4$ and glass starting materials were mixed together. The amounts of glass starting materials were 1 wt %, 10 wt % and 50 wt %. The mixed powders were consolidated into cylinders of 10 mm diameter and 10 mm height. The glass starting materials are selected from +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). The compositions of 1 wt %, 10 wt % and 50 wt % glass starting materials are listed in the Table 9.

TABLE 9

| | Compositions |
|---|---|
| 1 wt % glass starting materials, labeled as 1 wt % SPCN | 0.56 wt % $SiO_2$ + 0.11 wt % $P_2O_5$ + 0.21 wt % CaO + 0.12 wt % $NaHCO_3$ |
| 10 wt % glass starting materials, labeled as 10 wt % SPCN | 5.61 wt % $SiO_2$ + 1.04 wt % $P_2O_5$ + 2.13 wt % CaO + 1.23 wt % $NaHCO_3$ |
| 50 wt % glass starting materials, labeled as 50 wt % SPCN | 28.06 wt % $SiO_2$ + 5.18 wt % $P_2O_5$ + 10.64 wt % CaO + 6.13 wt % $NaHCO_3$ |

The samples were fired at 900° C. to 1200° C. for 1 hour. The densities of samples were recorded after firing, as shown in the Table 10.

TABLE 10

| | | $CaSO_4$ | $CaSO_4$ + 1 wt % glass starting materials (1 wt % SPCN) | $CaSO_4$ + 10 wt % glass starting materials (10 wt % SPCN) | $CaSO_4$ + 50 wt % glass starting materials (50 wt % SPCN) |
|---|---|---|---|---|---|
| EXAMPLE 40 | 25° C. density (g/cm$^3$) | 2.1 | 1.9 | 1.9 | 1.7 |

TABLE 10-continued

|  |  | CaSO₄ | CaSO₄ + 1 wt % glass starting materials (1 wt % SPCN) | CaSO₄ + 10 wt % glass starting materials (10 wt % SPCN) | CaSO₄ + 50 wt % glass starting materials (50 wt % SPCN) |
|---|---|---|---|---|---|
| EXAMPLE 41 | 900° C. density (g/cm³) | / | 2.2 | 1.9 | 1.5 |
| EXAMPLE 42 | 1000° C. density (g/cm³) | / | 2.7 | 2.3 | 1.6 |
| EXAMPLE 43 | 1100° C. density (g/cm³) | / | 2.8 | 2.7 | 1.5 |
| EXAMPLE 44 | 1200° C. density (g/cm³) | / | 2.5 | 2.6 | 1.6 |

/: The density of samples cannot be measured due to the collapse of the samples.

Hereinbefore, the EXAMPLES show that the density of calcium sulfate (CaSO₄) is increased after the suitable heat treatment. It indicates that after the heat treatment, the sintering ability of calcium sulfate can be improved by adding various amounts of glass starting materials (SPCN). The amounts of glass starting materials are 1 wt %, 10 wt % and 50 wt %. It indicates that the addition of various amounts of glass starting materials can assist the densification of calcium sulfate.

Example 45

The samples for this EXAMPLE of the present invention were prepared using the same method as in EXAMPLE 41. The sample was fired at 900° C. for 1 hour. The photographs of samples are shown in FIGS. 15(a) to 15(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 15(a)). It indicates that the sintering ability of calcium sulfate can be improved by adding various amounts (1 wt %, 10 wt % and 50 wt %) of glass starting materials (SPCN). The glass starting materials are selected from +1 and/or +2 and/or +3 and/or +4 and/or +5 valence compounds.

Example 46

The samples for this EXAMPLE of the present invention were prepared using the same method as in EXAMPLE 42. The samples were fired at 1000° C. for 1 hour. The photographs of samples are shown in FIGS. 16(a) to 16(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 16(a)). It indicates that the sintering ability of calcium sulfate can be improved by adding various amounts (1 wt %, 10 wt % and 50 wt %) of glass starting materials (SPCN). The glass starting materials are selected from +1 and/or +2 and/or +3 and/or +4 and/or +5 valence compounds.

Example 47

The samples for this EXAMPLE of the present invention were prepared using the same method as in EXAMPLE 43. The samples were fired at 1100° C. for 1 hour. The photographs of samples are shown in FIGS. 17(a) to 17(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 17(a)). It indicates that the sintering ability of calcium sulfate can be improved by adding various amounts (1 wt %, 10 wt % and 50 wt %) of glass starting materials. The glass starting materials are selected from +1 and/or +2 and/or +3 and/or +4 and/or +5 valence compounds.

Example 48

The samples for this EXAMPLE of the present invention were prepared using the same method as in EXAMPLE 44. The samples were fired at 1200° C. for 1 hour. The photographs of samples are shown in FIGS. 18(a) to 18(d).

Hereinbefore, the EXAMPLE shows that the calcium sulfate samples added with 1 wt %, 10 wt % and 50 wt % glass starting materials (SPCN) exhibit improved sintering ability during the heat treatment. The samples added with the sintering additives still hold their shapes after the heat treatment. However, the calcium sulfate without the glass starting materials collapses after the heat treatment (see FIG. 18(a)). It indicates that the sintering ability of calcium sulfate can be improved by adding various amounts (1 wt %, 10 wt % and 50 wt %) of glass starting materials. The glass starting materials are selected from +1 and/or +2 and/or +3 and/or +4 and/or +5 valence compounds.

Examples 49 to 52

The cylinder samples for these examples of the present invention were prepared using the same methods as in EXAMPLES 41 to 44. The samples were made into cylinder of 10 mm diameter and 10 mm height. The samples were fired at 900° C. to 1200° C. for 1 hour. After firing, the samples were then ground to obtain flat surfaces. The compressive strength of cylinder samples was measured by using the instrument (MTS810, MTS, USA) at the room temperature. The displacement rate was 0.96 mm/min. The compressive strength of samples is presented in the Table 11.

TABLE 11

| | | $CaSO_4$ | $CaSO_4$ + 1 wt % glass starting materials (1 wt % SPCN) | $CaSO_4$ + 10 wt % glass starting materials (10 wt % SPCN) | $CaSO_4$ + 50 wt % glass starting materials (50 wt % SPCN) |
|---|---|---|---|---|---|
| EXAMPLE 49 | 900° C./ compressive strength (MPa) | / | 80 ± 3 | 42 ± 1 | 49 ± 1 |
| EXAMPLE 50 | 1000° C./ compressive strength (MPa) | / | 171 ± 3 | 119 ± 10 | 26 ± 1 |
| EXAMPLE 51 | 1100° C./ compressive strength (MPa) | / | 126 ± 7 | 157 ± 21 | 12 ± 1 |
| EXAMPLE 52 | 1200° C./ compressive strength (MPa) | / | 42 ± 3 | 86 ± 10 | 7 ± 1 |

/: The compressive strength of samples cannot be measured due to the collapse of the samples.

Hereinbefore, the EXAMPLES show that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased via adding 1 wt %, 10 wt % and 50 wt % glass starting materials. The glass starting materials are selected from +1 and/or +2 and/or +3 and/or +4 and/or +5 valence compounds. By using the suitable sintering profile, the compressive strength of calcium sulfate added with the sintering additives is around 171 MPa. It suggests that the sintering ability of calcium sulfate can be improved by adding various amounts of glass starting materials as sintering additives.

Hereinbefore, the EXAMPLES reveal that the sintering ability of calcium sulfate can be improved by adding four kinds of additives. These additives may form glass during sintering, and are thus referred to as glass starting materials. Glass is a amorphous solid which its crystalline structure is lacking of long-range order. As several metallic compounds or metallic oxides are heated at the elevated temperature, the metallic ions may not have enough time to form the long-range order. Amorphous phase is then formed. As some fine crystals are formed and dispersed within the glassy matrix, the material is also termed as the glass-ceramics. The glass and glass-ceramic materials can flow at elevated temperature. The addition of suitable glass or glass-ceramic can assist the densification of ceramics. Hereinafter, the EXAMPLES reveal that the sintering ability of calcium sulfate can be improved by adding two or more than two kinds of glass starting materials. All the materials used for these EXAMPLES are calcium sulfate, +1 valence glass starting material (such as sodium hydrogen carbonate, $NaHCO_3$), +2 valence glass starting material (such as calcium oxide, CaO), +4 valence glass starting material (such as silica, $SiO_2$) and +5 valence glass starting material (such as phosphorous pentoxide, $P_2O_5$). These additives easily form a glass or a glass-ceramic during sintering Examples 53 to 57

In these EXAMPLES of the present invention, $CaSO_4$ and glass starting materials were first mixed together. The amount of glass starting materials was 1 wt %. The mixed powders were consolidated into cylinders of 10 mm diameter and 10 mm height. The glass starting materials were selected from +1 valence glass starting materials (e.g. sodium hydrogen carbonate, $NaHCO_3$), +2 valence glass starting materials (e.g. calcium oxide, CaO), +4 valence glass starting materials (e.g. silica, $SiO_2$) and +5 valence glass starting materials (e.g. phosphorus pentoxide, $P_2O_5$). The compositions of glass starting materials are listed in the Table 12.

TABLE 12

| | Compositions |
|---|---|
| 1 wt % glass starting materials, labeled as 1 wt % SP | 0.8 wt % $SiO_2$ + 0.2 wt % $P_2O_5$ |
| 1 wt % glass starting materials, labeled as 1 wt % SPN | 0.71 wt % $SiO_2$ + 0.13 wt % $P_2O_5$ + 0.16 wt % $NaHCO_3$ |
| 1 wt % glass starting materials, labeled as 1 wt % SPC | 0.59 wt % $SiO_2$ + 0.15 wt % $P_2O_5$ + 0.26 wt % CaO |
| 1 wt % glass starting materials, labeled as 1 wt % SPCN | 0.56 wt % $SiO_2$ + 0.11 wt % $P_2O_5$ + 0.21 wt % CaO + 0.12 wt % $NaHCO_3$ |

The samples were fired at 900° C. to 1200° C. for 1 hour. The densities of samples were recorded after firing, as shown in the Table 13.

TABLE 13

| | | $CaSO_4$ | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|---|
| EXAMPLE 53 | 25° C. density (g/cm³) | 2.1 | 1.9 | 1.9 | 1.9 | 1.9 |

TABLE 13-continued

|  |  | CaSO$_4$ | CaSO$_4$ + 1 wt % glass starting materials (SP) | CaSO$_4$ + 1 wt % glass starting materials (SPN) | CaSO$_4$ + 1 wt % glass starting materials (SPC) | CaSO$_4$ + 1 wt % glass starting materials (SPCN) |
|---|---|---|---|---|---|---|
| EXAMPLE 54 | 900° C. density (g/cm$^3$) | / | 2.0 | 2.4 | 1.9 | 2.2 |
| EXAMPLE 55 | 1000° C. density (g/cm$^3$) | / | 2.4 | 2.8 | 2.3 | 2.7 |
| EXAMPLE 56 | 1100° C. density (g/cm$^3$) | / | 2.8 | 2.7 | 2.8 | 2.8 |
| EXAMPLE 57 | 1200° C. density (g/cm$^3$) | / | 2.7 | 2.6 | 2.7 | 2.5 |

Hereinbefore, the examples show that the density of calcium sulfate (CaSO$_4$) added with two or more than two glass starting materials is increased after the heat treatment. It indicates that after the heat treatment, the sintering ability of calcium sulfate can be improved by adding two or more glass starting materials selected from +1 and/or +2 and/or +3 and/or +4 and/or +5 valence compounds. It also means that adding SiO$_2$ and/or NaHCO$_3$ and/or CaO and/or P$_2$O$_5$ can assist the densification of calcium sulfate.

Example 58

The samples for this EXAMPLE of the present invention were prepared using the same method as in EXAMPLE 54. The samples were fired at 900° C. for 1 hour. The photographs of samples are shown in FIGS. 19(a) to 19(e).

Hereinbefore, the EXAMPLE shows that the calcium sulfate samples added with two or more than two kinds of glass starting materials exhibit improved sintering ability during the heat treatment. The combinations of glass starting materials are selected from NaHCO$_3$, CaO, SiO$_2$ and P$_2$O$_5$. The samples added with the glass starting materials still hold their shapes after the heat treatment. However, the calcium sulfate without the glass starting materials collapses after the heat treatment (see FIG. 19(a)). It indicates that the sintering ability of calcium sulfate can be improved by adding two or more than two kinds of glass starting materials selected from +1 and/or +2 and/or +3 and/or +4 and/or +5 valence compounds.

Example 59

The samples for this EXAMPLE of the present invention were prepared using the same method as in EXAMPLE 55. The samples were fired at 1000° C. for 1 hour. The photographs of samples are shown in FIGS. 20(a) to 20(e).

Hereinbefore, the EXAMPLE shows that the calcium sulfate samples added with two or more than two kinds of glass starting materials exhibit improved sintering ability during the heat treatment. The combinations of glass starting materials are selected from NaHCO$_3$, CaO, SiO$_2$ and P$_2$O$_5$. The samples added with the glass starting materials still hold their shapes after the heat treatment. However, the calcium sulfate without the glass starting materials collapses after the heat treatment (see FIG. 20(a)). It indicates that the sintering ability of calcium sulfate can be improved by adding two or more than two kinds of glass starting materials selected from +1 and/or +2 and/or +3 and/or +4 and/or +5 valence compounds.

Example 60

The samples for this EXAMPLE of the present invention were prepared using the same method as in EXAMPLE 56. The samples were fired at 1100° C. for 1 hour. The photographs of samples are shown in FIGS. 21(a) to 21(e).

Hereinbefore, the EXAMPLE shows that the calcium sulfate samples added with two or more than two kinds of glass starting materials exhibit improved sintering ability during the heat treatment. The combinations of glass starting materials are selected from NaHCO$_3$, CaO, SiO$_2$ and P$_2$O$_5$. The samples added with the glass starting materials still hold their shapes after the heat treatment. However, the calcium sulfate without the glass starting materials collapses after the heat treatment (see FIG. 21(a)). It indicates that the sintering ability of calcium sulfate can be improved by adding two or more than two kinds of glass starting materials selected from +1 and/or +2 and/or +3 and/or +4 and/or +5 valence compounds.

Example 61

The samples for this EXAMPLE of the present invention were prepared using the same method as in EXAMPLE 57. The samples were fired at 1200° C. for 1 hour. The photographs of samples are shown in FIGS. 22(a) to 22(e).

Hereinbefore, the EXAMPLE shows that the calcium sulfate samples added with two or more than two kinds of glass starting materials exhibit improved sintering ability during the heat treatment. The combinations of glass starting materials are selected from NaHCO$_3$, CaO, SiO$_2$ and P$_2$O$_5$. The samples added with the glass starting materials still hold their shapes after the heat treatment. However, the calcium sulfate without the glass starting materials collapses after the heat treatment (see FIG. 22(a)). It indicates that the sintering ability of calcium sulfate can be improved by adding two or more than two kinds of glass starting materials selected from +1 and/or +2 and/or +3 and/or +4 and/or +5 valence compounds.

Examples 62 to 65

The cylinder samples for these examples of the present invention were prepared using the same methods as in EXAMPLES 54 to 57. The samples were made into cylinders of 9 mm diameter and 9 mm height. The samples were fired at 900° C. to 1200° C. for 1 hour. After firing, the samples were then ground to obtain flat surfaces. The compressive strength of cylinder samples was measured by using the universal testing instrument (MTS810, MTS, USA) at the room temperature. The displacement rate was 0.96 mm/min. The compressive strength of samples is presented in the Table 14.

TABLE 14

|  |  | $CaSO_4$ | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|---|
| EXAMPLE 62 | >900° C./ compressive strength (MPa) | / | 10 ± 6 | 87 ± 5 | 11 ± 1 | 80 ± 3 |
| EXAMPLE 63 | 1000° C./ compressive strength (MPa) | / | 62 ± 7 | 184 ± 7 | 52 ± 10 | 171 ± 3 |
| EXAMPLE 64 | 1100° C./ compressive strength (MPa) | / | 128 ± 17 | 103 ± 8 | 155 ± 6 | 126 ± 7 |
| EXAMPLE 65 | 1200° C./ compressive strength (MPa) | / | 92 ± 9 | 61 ± 3 | 77 ± 4 | 42 ± 3 |

/: The compressive strength of samples cannot be measured due to the collapse of the samples.

Hereinbefore, the examples show that the compressive strength of pure calcium sulfate ($CaSO_4$) cannot be measured owing to the collapse of samples. It indicates that the pure calcium sulfate cannot be sintered by using the heat treatment. However, the compressive strength of $CaSO_4$-based samples is increased by adding two or more than two kinds of glass starting materials as sintering additives. In the appropriate condition, the compressive strength of calcium sulfate added with the sintering additives is around 184 MPa. It suggests that the sintering ability of calcium sulfate can be improved by adding two or more than two kinds of sintering additives (glass starting materials). The glass starting materials are selected from +1 and/or +2 and/or +3 and/or +4 and/or +5 and/or valence glass starting materials.

Example 66

For the present EXAMPLE, firstly, $CaSO_4$ and glass starting materials were first mixed together. The amount of glass starting materials was 14.5 wt %. The mixed powders were consolidated into cylinders of 25.4 mm diameter and 3 mm height. The glass starting materials were selected from +3 valence glass starting materials (e.g. aluminum oxide, $Al_2O_3$) and +4 valence glass starting materials (e.g. silica, $SiO_2$). The compositions of glass starting materials are listed in the Table 15.

TABLE 15

| | Compositions |
|---|---|
| 14.5 wt % glass starting materials, labeled as SA | 5 wt % $SiO_2$ + 9.5 wt % $Al_2O_3$ |

The samples were fired at 1100° C. for 3 hours. The densities of samples were recorded after firing, as shown in the Table 16.

TABLE 16

|  |  | $CaSO_4$ | $CaSO_4$ + 14.5 wt % glass starting materials (SA) |
|---|---|---|---|
| EXAMPLE 66 | 1100° C. density (g/cm³) | / | 1.7 |

/: The densities of samples cannot be measured due to the collapse of the samples.

Hereinbefore, the example shows that the density of calcium sulfate ($CaSO_4$) added with two kinds of glass starting materials is increased after the suitable heat treatment. It indicates that after the heat treatment, the sintering ability of calcium sulfate can be improved by adding two kinds of glass starting materials selected from +1 and/or +2 and/or +3 and/or +4 and/or +5 valence compounds. It also suggests that adding $SiO_2$ and $Al_2O_3$ can assist the densification of calcium sulfate.

Example 67

Figure 23A:
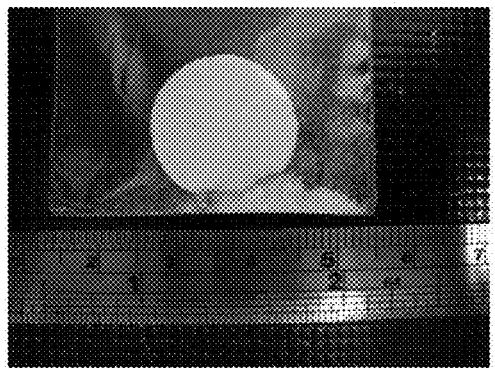
FIGS. 23(a) and 23(b) respectively depict the photographs of (a) calcium sulfate and (b) calcium sulfate+14.5 wt % starting materials of glass (SA) specimens after firing at 1100° C., wherein SA is the combination of $SiO_2$ and $Al_2O_3$.
Figure 23B:
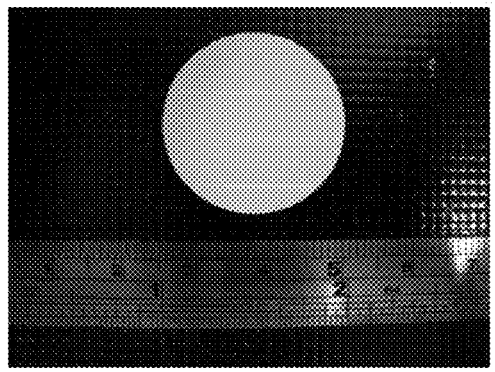
Figure 24A:
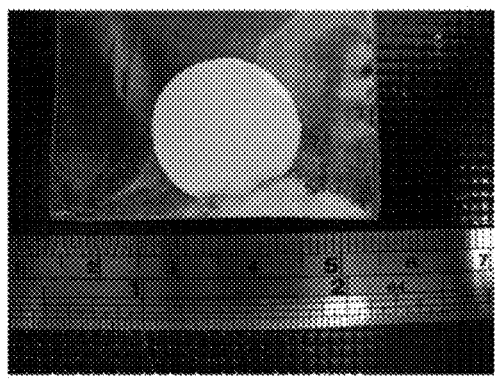
FIGS. 24(a) to 24(d) respectively depict the photographs of (a) calcium sulfate and (b) calcium sulfate+1 wt % silica, (c) calcium sulfate+10 wt % silica and (d) calcium sulfate+50 wt % silica specimens after firing at 1100° C.
Figure 24B:
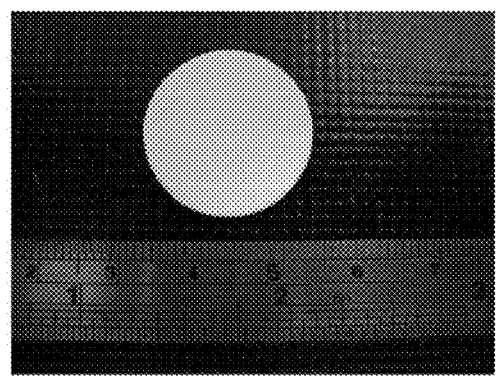
Figure 24C:
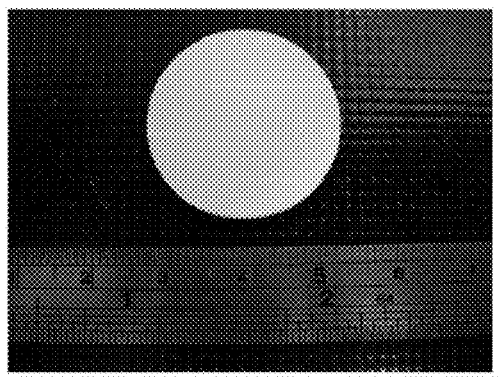
Figure 24D:
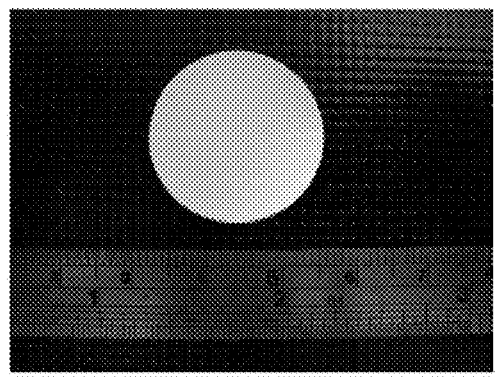

The samples for this EXAMPLE of the present invention were prepared using the same method as in EXAMPLE 66. The samples were fired at 1100° C. for 3 hours. The photographs of samples are shown in FIGS. 23(a) to 23(b).

Hereinbefore, the EXAMPLE shows that the calcium sulfate samples added with two kinds of glass starting materials exhibit improved sintering ability during the heat treatment. The samples added with the glass starting materials still hold their shapes after the heat treatment. However, the calcium sulfate without the glass starting materials collapses after the heat treatment (see FIG. 23(a)). It indicates that the sintering ability of calcium sulfate can be improved by adding two kinds of glass starting materials selected from +1 and/or +2 and/or +3 and/or +4 and/or +5 valence compounds. The glass starting materials are selected from +3 valence glass starting materials (e.g. $Al_2O_3$) and +4 valence glass starting materials (e.g. $SiO_2$)

Example 68

The disc samples for these EXAMPLES of the present invention were prepared using the same methods as in EXAMPLE 66. The samples were fired at 1100° C. for 3 hours. The samples were then ground to obtain flat surfaces firstly. The flexural strength of disc samples were measured by using the biaxial 4-ball bending test (instrument: MTS810, MTS Co., USA) at the room temperature. The displacement rate was 0.48 mm/min. The flexural strength of samples is presented in the Table 17.

TABLE 17

|  |  | $CaSO_4$ | $CaSO_4$ + 14.5 wt % glass starting materials (SA) |
|---|---|---|---|
| EXAMPLE 68 | flexural strength (MPa) | / | 20 ± 1 |

/: The flexural strength of samples cannot be measured due to the collapse of the samples.

Hereinbefore, the example shows that the flexural strength of pure calcium sulfate ($CaSO_4$) cannot be measured owing to the collapse of samples. It indicates that the pure calcium sulfate cannot be sintered by using the heat treatment. However, the flexural strength of $CaSO_4$-based samples is increased by adding two kinds of glass starting materials as sintering additives. It suggests that the sintering ability of calcium sulfate can be improved by adding two kinds of sintering additives (or glass starting materials) selected from +1 and/or +2 and/or +3 and/or +4 and/or +5 valence compounds. The glass starting materials used for EXAMPLE 68 are $Al_2O_3$ and $SiO_2$.

Hereinbefore, the EXAMPLES reveal that the sintering ability of calcium sulfate can be improved by adding two or more than two kinds of glass starting materials as sintering additives. The glass starting materials used for the present invention are selected from +1 and/or +2 and/or +3 and/or +4 and/or +5 valence glass starting materials. Hereinafter, the EXAMPLES reveal that the sintering ability of calcium sulfate can also be improved by adding one glass starting material. The materials used in the following EXAMPLES are calcium sulfate powders and +4 valence glass starting material (silica, $SiO_2$). The +4 valence glass starting material is used as the sintering additive.

Example 69

The materials used in the following EXAMPLES were calcium sulfate powder and +4 valence glass starting material (silica, $SiO_2$). Firstly, $CaSO_4$ and +4 valence glass starting materials ($SiO_2$) were first mixed together. The amounts of glass starting materials were 1 wt %, 10 wt % and 50 wt %. The mixed powders were consolidated into cylinders of 25.4 mm diameter and 3 mm height. The samples were fired at 1100° C. for 3 hours. The densities of samples were recorded after firing, as shown in the following Table 18.

TABLE 18

|  | $CaSO_4$ | $CaSO_4$ + 1 wt % $SiO_2$ | $CaSO_4$ + 10 wt % $SiO_2$ | $CaSO_4$ + 50 wt % $SiO_2$ |
|---|---|---|---|---|
| 1100° C. density (g/cm³) | / | 2.7 | 1.6 | 1.9 |

/: The densities of samples cannot be measured due to the collapse of the samples.

Hereinbefore, the EXAMPLE shows that the density of calcium sulfate ($CaSO_4$) added with 1 wt %, 10 wt % and 50 wt % glass starting materials is increased after the suitable heat treatment. It indicates that after the heat treatment, the sintering ability of calcium sulfate can be improved by adding various amounts (1 wt %, 10 wt % and 50 wt %) of +4 valence glass starting materials (e.g. $SiO_2$). It also means that adding various amounts of +4 valence glass starting materials can assist the densification of calcium sulfate.

Example 70

The samples for this EXAMPLE of the present invention were prepared using the same method as in EXAMPLE 69. The samples were fired at 1100° C. for 3 hours. The photographs of samples are shown in FIGS. 24(a) to 24(d).

Hereinbefore, the EXAMPLE shows that the calcium sulfate samples added with 1 wt %, 10 wt % and 50 wt %+4 valence glass starting materials ($SiO_2$) exhibit improved sintering ability during the heat treatment. The samples added with various amounts of glass starting materials still hold their shapes after the heat treatment. However, the calcium sulfate without the glass starting materials collapses after the heat treatment (see FIG. 24(a)). It indicates that the sintering ability of calcium sulfate can be improved by adding various amounts of +4 valence glass starting materials. Hereinbefore, the EXAMPLE reveals that the sintering ability of calcium sulfate can be improved by adding one kind of sintering additives selected from +1 or +2 or +3 or +4 or +5 valence compounds.

Example 71

Figure 25:
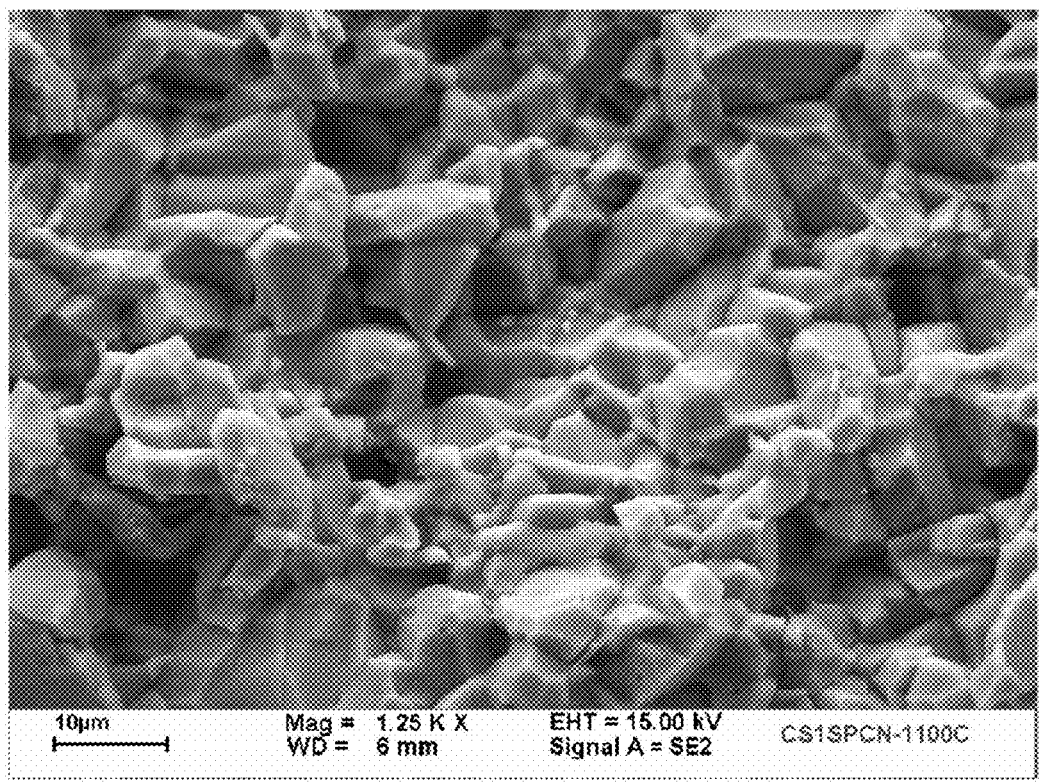
FIG. 25 depicts the SEM micrograph of the specimen after firing at 1100° C., wherein the specimen comprises calcium sulfate+1 wt % starting materials of glass (SPCN).

The samples for this EXAMPLE of the present invention were prepared using the same method as in EXAMPLE 43. The compositions of samples were calcium sulfate added with 1 wt % glass starting materials. The glass starting materials comprised 0.56 wt % $SiO_2$, 0.11 wt % $P_2O_5$, 0.21 wt % CaO and 0.12 wt % $NaHCO_3$. The samples were fired at 1100° C. for 1 hour. The SEM micrograph of sample is shown in FIG. 25. It can be found that the sample is dense after firing.

Hereinbefore, the EXAMPLE reveals that the calcium sulfate added four additives ($NaHCO_3$, CaO, $SiO_2$ and $P_2O_5$) exhibits improved sintering ability during firing. It indicates that the sintering ability of calcium sulfate can be improved by adding four kinds of glass starting materials selected from +1 and/or +2 and/or +3 and/or +4 and/or +5 valence compounds.

Examples 72 to 78

The samples for these EXAMPLES of the present invention were prepared using the same method as in EXAMPLE 43. The samples comprised calcium sulfate and 1 wt % glass starting materials (SP, SPN, SPC and SPCN), wherein SP is the combination of $SiO_2$ and $P_2O_5$; SPN is the combination of $SiO_2$, $P_2O_5$ and $NaHCO_3$, SPC is the combination of $SiO_2$, $P_2O_5$ and CaO; and SPCN is the combination of $SiO_2$, $P_2O_5$, CaO and $NaHCO_3$. The samples were fired at 1100° C. for 1 hour. After firing, the samples were placed into the test tube with normal saline, and then, the test tubes were put into the water bath at a temperature of 37.5° C. The ratio of sample to normal saline was 1 to 10. The pH value of samples was recorded for 7 days, as shown in the Table 19. The pH value of normal saline was recorded for the purpose of comparison.

TABLE 19

|  |  | Normal saline | $CaSO_4$ + 1 wt % glass starting materials (SP) | $CaSO_4$ + 1 wt % glass starting materials (SPN) | $CaSO_4$ + 1 wt % glass starting materials (SPC) | $CaSO_4$ + 1 wt % glass starting materials (SPCN) |
|---|---|---|---|---|---|---|
| EXAMPLE 72 | 1$^{st}$ day's pH | 5.3 | 6.1 | 6.2 | 6.2 | 6.2 |
| EXAMPLE 73 | 2$^{nd}$ day's pH | 5.4 | 6.3 | 6.3 | 6.5 | 6.5 |

TABLE 19-continued

|  |  | Normal saline | CaSO$_4$ + 1 wt % glass starting materials (SP) | CaSO$_4$ + 1 wt % glass starting materials (SPN) | CaSO$_4$ + 1 wt % glass starting materials (SPC) | CaSO$_4$ + 1 wt % glass starting materials (SPCN) |
|---|---|---|---|---|---|---|
| EXAMPLE 74 | 3$^{rd}$ day's pH | 5.3 | 6.5 | 6.4 | 6.6 | 6.6 |
| EXAMPLE 75 | 4$^{th}$ day's pH | 5.3 | 6.4 | 6.3 | 6.6 | 6.5 |
| EXAMPLE 76 | 5$^{th}$ day's pH | 5.4 | 6.6 | 6.5 | 6.7 | 6.6 |
| EXAMPLE 77 | 6$^{th}$ day's pH | 4.7 | 6.4 | 6.3 | 6.6 | 6.5 |
| EXAMPLE 78 | 7$^{th}$ day's pH | 4.8 | 6.4 | 6.2 | 6.5 | 6.4 |

Hereinbefore, the EXAMPLES reveal that after firing, the pH value of calcium sulfate added with two or more than two kinds of sintering additives (glass starting materials) is around 6.1 to 6.7, which is located in the range of human body's pH (6 to 8). It indicates that after firing, the pH value of calcium sulfate added with sintering additives is located in the range of human body's pH. The sintering additives used for the present invention are selected from +1 and/or +2 and/or +3 and/or +4 and/or +5 valence compounds, such as SiO$_2$ and/or P$_2$O$_5$ and/or CaO and/or NaHCO$_3$. These sintering additives can form glass or glass ceramic during sintering. The glass or glass ceramic assists the densification of calcium sulfate. The presence of the glass or glass-ceramic is stable in body fluid.

Example 79

The samples for the EXAMPLE of the present invention were prepared using the same method as in EXAMPLE 43. The samples comprised of calcium sulfate and 1 wt % glass starting materials (SP, SPN, SPC and SPCN). The samples were fired at 1100° C. for 1 hour. After firing, the cytotoxicity of samples was determined by MTT (microculture tetrazolium, 3-(4,5-Dimethylthiazol-2-yl)-2,5-diphenyltetrazolium bromide) assay. First, the powder of samples was immersed in the medium for extraction. They were placed in the incubator for 24 hours. The test tubes were then centrifuged, and the supernatant aqueous solution was collected. The solution was then filtered by 0.22 μm aseptic filtering membrane. In addition, the cultured L929 cells were seeded into 96-well culture dish. The cell density of each well was 10$^4$ cells/mL. The cells were then incubated for 24 hours. After the treatment, the extracted solution was dropped into each well, and then, the further 24-hour incubation was carried out. After that, the extracted solution was removed, and new medium and MTT working solution were dropped into each well. After incubating for 4 hours, the dimethyl sulfoxide (DMSO) solution was dropped. The absorption of light with 540 nm wavelength in each well was measured by an optical spectroscopy (ELISA Co.) reader. The viability of samples is shown in the Table 20.

TABLE 20

|  | CaSO$_4$ + 1 wt % glass starting materials (SP) | CaSO$_4$ + 1 wt % glass starting materials (SPN) | CaSO$_4$ + 1 wt % glass starting materials (SPC) | CaSO$_4$ + 1 wt % glass starting materials (SPCN) | DMSO (dimethyl sulfoxide) |
|---|---|---|---|---|---|
| viability (%) | 80 ± 6 | 88 ± 7 | 101 ± 14 | 102 ± 12 | 4 ± 2 |

The DMSO (dimethl sulfoxide) is the positive control. It is toxic and harmful to cells.

Hereinbefore, the EXAMPLES reveal that after firing, viability of calcium sulfate added two or more than two kinds of sintering additives (glass starting materials) is higher than 80%. It indicates that after firing, calcium sulfate added with sintering additives shows good results of viability. The sintering additives used for the present invention are selected from +1 and/or +2 and/or +3 and/or +4 and/or +5 valence compounds, such as SiO$_2$ and/or P$_2$O$_5$ and/or CaO and/or NaHCO$_3$. These sintering additives can form glass or glass ceramic during sintering. The glass or glass ceramic assists the densification of calcium sulfate. The glass or glass ceramic is not toxic to cells.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A sinterable calcium sulfate ceramic material consisting of calcium sulfate and a sintering additive, which are mixed together, wherein the sinterable calcium sulfate ceramic material is a biomaterial, the sintering additive is added to the calcium sulfate to make the non-sinterable calcium sulfate become sinterable, the sintering additive is selected from the group consisting of the +1 valence element and the compound thereof containing a sodium (Na) element and the compound thereof, and the +1 valence element and the compound thereof contain sodium hydrogen carbonate (NaHCO$_3$).

2. A sinterable calcium sulfate ceramic material consisting of calcium sulfate and a sintering additive, which are mixed together, wherein the sinterable calcium sulfate ceramic material is a biomaterial, the sintering additive is added to the calcium sulfate to make the non-sinterable calcium sulfate become sinterable, the sintering additive is selected from the group consisting of the +5 valence element and the compound thereof containing a phosphorus (P) element and the compound thereof, and the +5 valence element and the compound thereof contain phosphorus pentoxide (P$_2$O$_5$).

3. A method of manufacturing a sinterable calcium sulfate ceramic material, the method comprising:
   providing calcium sulfate; and
   mixing a sintering additive with the calcium sulfate to prepare a mixture; and
   shaping the mixture in a mold to form a product; and
   sintering the product at a temperature ranging from 900° C. to 1400° C. to form the sinterable calcium sulfate ceramic material, which is a biomaterial, wherein the sintering additive is added to the calcium sulfate to make the non-sinterable calcium sulfate become sinterable.

4. The method in accordance with claim 3, wherein the sintering additive is selected from the group consisting of a +1 valence element and a compound thereof, a +2 valence element and a compound thereof, a +3 valence element and a compound thereof, a +4 valence element and a compound thereof and a +5 valence element and a compound thereof.

5. The method in accordance with claim 3, wherein a weight ratio of the sintering additive to the calcium sulfate ranges from 0.5% to 50%.

6. The method in accordance with claim 3, wherein the sintering additive is a glass starting material which can form a glass or a glass-ceramic material during sintering.

\* \* \* \* \*